United States Patent
Kawana

(10) Patent No.: US 6,967,727 B1
(45) Date of Patent: Nov. 22, 2005

(54) IMAGE FORMING APPARATUS AND IMAGE FORMING METHOD

(75) Inventor: Takashi Kawana, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1000 days.

(21) Appl. No.: 09/675,141

(22) Filed: Sep. 29, 2000

(30) Foreign Application Priority Data

Sep. 30, 1999 (JP) .................................. 11-280596
Sep. 30, 1999 (JP) .................................. 11-280600

(51) Int. Cl.[7] .......................................... G06F 15/00
(52) U.S. Cl. ...................... 358/1.11; 358/1.12; 358/1.9; 358/296; 358/450
(58) Field of Search .............................. 358/1.11, 1.12, 358/1.9, 450, 443, 296, 501; 347/3, 43

(56) References Cited

U.S. PATENT DOCUMENTS 4,637,679 A   1/1987  Funato 5,832,186 A * 11/1998 Kawana ...................... 358/1.9

FOREIGN PATENT DOCUMENTS

| EP | 0 551 016 A1 | 7/1993 |
| EP | 0 705 022 A2 | 4/1996 |
| EP | 0 892 544 A2 | 1/1999 |

* cited by examiner

Primary Examiner—Twyler Lamb
(74) Attorney, Agent, or Firm—Fitzpatrick Cella Harper & Scinto

(57) ABSTRACT

An image forming apparatus for forming an image of multilevel image data includes a driving unit for driving an image forming element for image formation, an additional data generating unit for generating a digital signal string based on predetermined additional data, and an input unit for superposing a digital signal string related to the multilevel image data and the digital signal string based on the additional data and inputting the superposed digital signal string to the driving unit.

28 Claims, 24 Drawing Sheets

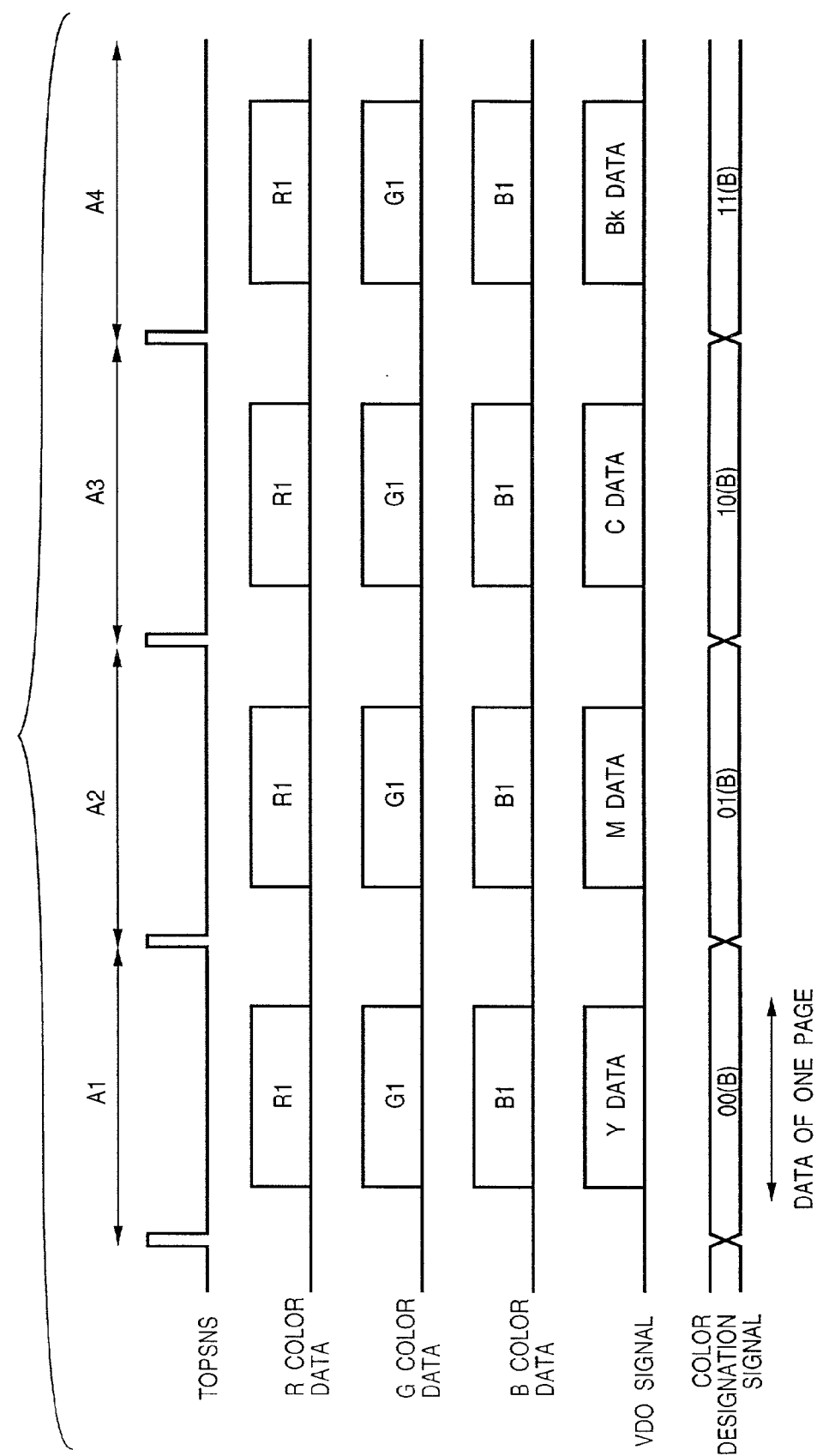

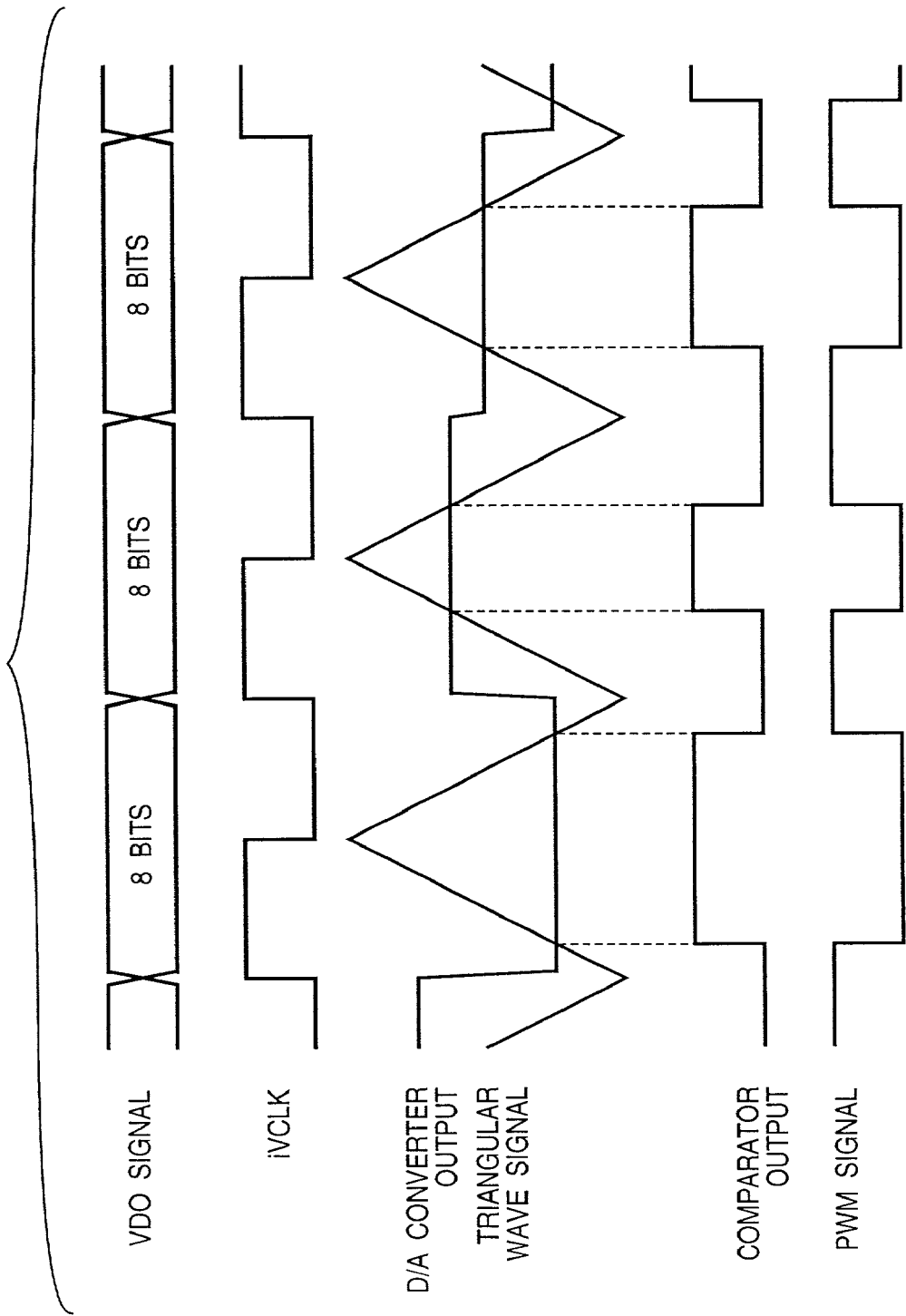

IMAGE FORMING APPARATUS AND IMAGE FORMING METHOD

FIELD OF THE INVENTION

The present invention relates to an image forming apparatus and image forming method and, more particularly, to an image forming apparatus and image forming method capable of contributing to prevention of, e.g., copying of securities.

BACKGROUND OF THE INVENTION

Recently, image forming apparatuses such as printers have been given color capability and used as various expressing means by users. In particular, color page printers are attracting attention because they are silent and capable of high-quality, high-speed printing.

A multicolor beam printer as one color page printer is characterized by printing a multicolor image by performing first development by scanning a light beam on a photosensitive body in a main scan direction, and then transferring the image onto a printing medium such as a printing paper sheet on a transfer carrier to perform predetermined processing.

A method of printing a multicolor image by this multicolor beam printer will be described below with reference to FIGS. 18 and 19.

FIG. 18 is a schematic view of a conventional multicolor beam printer. FIG. 19 is a block diagram of signal processing.

Referring to FIG. 18, a photosensitive drum 201 which rotates in the direction of an arrow at a predetermined constant velocity is charged to a predetermined polarity and a predetermined voltage by a charger 204.

Printing sheets P are fed one by one at a predetermined timing from a paper feed cassette 215 by a paper feed roller 214. When a sensor 202 senses the leading edge of the printing sheet, a laser beam L modulated by an image signal VDO is emitted from a semiconductor laser 205 toward a polygonal mirror 207.

This laser beam L is scanned by the polygonal mirror 207 and guided onto the photosensitive drum 201 via a lens 208 and a mirror 209.

A signal (to be referred to as TOPSNS hereinafter) from the sensor 202 placed at one end of light scan is output as a vertical sync signal to an image processor 250 (FIG. 19).

The image signal VDO is sequentially supplied to the semiconductor laser 205 in synchronism with a BD signal (to be described later) which follows the TOPSNS signal. When the laser beam L enters a detector 217, a beam detection signal (to be referred to as a BD signal hereinafter) serving as a horizontal sync signal is output.

The polygonal mirror 207 is driven by a scanner motor 206. This scanner motor 206 is controlled by a motor control circuit 225 so as to rotate at a predetermined constant velocity in accordance with a signal S2 from a frequency divider 221 which divides the frequency of a signal S1 from a reference oscillator 220 shown in FIG. 19.

The photosensitive drum 201 is exposed by scan in synchronism with the BD signal, and a developing device 203Y develops a first electrostatic latent image. After that, a first toner image of yellow is formed on the photosensitive drum 201.

Immediately before the leading edge of the printing sheet P fed at a predetermined timing reaches a transfer start position, a predetermined transfer bias voltage having a polarity opposite to that of toner is applied to a transfer drum 216. Consequently, the first toner image is transferred onto the printing sheet P, and at the same time this printing sheet P is electrostatically attracted to the surface of the transfer drum 216.

Subsequently, a second electrostatic latent image is formed on the photosensitive drum 201 by manipulating the laser beam L. A developing device 203M develops this second electrostatic latent image to form a second toner image of magenta on the photosensitive drum 201. This second toner image is transferred onto the printing sheet P so as to be aligned with the position of the first toner image previously transferred onto the printing sheet P. Note that the end of the image of each color is defined by the TOPSNS signal.

Analogously, a third electrostatic latent image is formed and developed by a developing device 203C, and a cyan toner image formed is aligned with and transferred onto the printing sheet P. A fourth electrostatic latent image is then formed and developed by a developing device 203K, and a black toner image formed is aligned with and transferred onto the printing sheet P.

As described above, a VDO signal of one page is output to the semiconductor laser 205 in each step. Also, whenever the transfer step is performed, a cleaner 210 scrapes off any untransferred toner image.

After that, when the leading edge of the printing sheet P on which the toner images of four colors are transferred approaches the position of a separation pawl 212, this separation pawl 212 comes in contact with the surface of the transfer drum 216 to separate the printing sheet P from the transfer drum 216. The end portion of this separation pawl 212 keeps contacting the transfer drum 216 until the trailing edge of the printing sheet P is separated from the transfer drum 216. After that, the separation pawl 212 moves away and returns to the original position. A charger 211 removes stored charge on the printing sheet P to facilitate separation of the printing sheet P by the separation pawl 212, and reduces air discharge during separation.

FIG. 20 is a timing chart showing the relationship between the TOPSNS signal and the VDO signal described above. Referring to FIG. 20, reference symbol A1 denotes a printing operation of the first color; A2, a printing operation of the second color; A3, a printing operation of the third color; and A4, a printing operation of the fourth color. These sections A1 to A4 form a color printing operation of one page.

FIG. 21 is a block diagram showing the system configuration of a conventional printer.

Referring to FIG. 21, a printer 302 receives a control signal and an image signal 307 from an external apparatus, e.g., a host computer 301. A printer controller 303 transfers the control signal to a printer control unit 304. The image signal is supplied to a laser driver 310 of a printer engine via an image processor 305 in the printer controller 303 and drives a semiconductor laser 306.

FIG. 22 is a block diagram showing the internal arrangement of the image processor 305 shown in FIG. 21. The image processor shown in FIG. 22 receives an image signal of 8 bits for each of R, G, and B, i.e., a total of 24 bits from the printer controller (not shown). A color processor 351 converts each of Y, M, C, and K signals into the 8-bit VDO signal described above at respective timings (FIG. 23 is a corresponding timing chart).

A γ correction unit 325 converts these Y, M, C, and K VDO signals into γ-corrected, 8-bit signals and inputs these signals to a pulse width modulation unit 353 (to be referred to as a PWM unit hereinafter) in the next stage. In this PWM unit 353, a latch 345 synchronizes the 8-bit image signal with the leading edge of an image clock iVClK. A D/A converter 355 converts the signal into an analog voltage and inputs the voltage to an analog comparator 356.

The image clock iVCLK is converted into a triangular wave by a triangular wave generator 358 and input to the analog comparator 356. This analog comparator 356 compares the two signals and outputs an image signal 309 subjected to PWM. An inverter 357 inverts the output signal to obtain a desired PWM signal.

FIG. 24 shows a timing chart when the PWM unit 353 generates a PWM signal. As shown in FIG. 24, when the input 8-bit image data to the PWM unit 353 is FF[H] (H indicates hexadecimal notation), the widest PWM signal is output. When the image data is 00[H], the narrowest PWM signal is output.

Unfortunately, the improved printing performance and high-quality printing capability of a conventional image forming apparatus as described above lead to frequent occurrence of forgery of securities such as paper money.

As the image formation technology improves in the future, the image quality improves accordingly, so this sort of crimes are expected to increase in number.

SUMMARY OF THE INVENTION

It is, therefore, an object of the present invention to provide an image forming apparatus and image forming method capable of adding predetermined information on an image in order to track down perpetrators in the event of such crimes.

According to the present invention, there is provided an image forming apparatus for forming an image of multilevel image data, comprising driving means for driving an image forming element for image formation, additional data generating means for generating a digital signal string based on predetermined additional data, and input means for superposing a digital signal string related to the multilevel image data and the digital signal string based on the additional data and inputting the superposed digital signal string to the driving means.

According to the present invention, there is provided an image forming method of forming an image of multilevel image data by using an image forming element for image formation and driving means for driving the image forming element, comprising the steps of generating a digital signal string based on predetermined additional data, and superposing a digital signal string related to the multilevel image data and the digital signal string based on the additional data and inputting the superposed digital signal string to the driving means.

According to the present invention, there is provided an image forming apparatus for forming an image of multilevel image data, comprising driving means for receiving a digital signal string related to the multilevel image data and driving an image forming element for image formation, and additional data generating means for generating a digital signal string based on predetermined additional data, wherein the driving means has an input terminal for forcedly controlling light emission of the image forming element, and a digital signal string based on the additional data is input to the input terminal of the additional data generating means.

According to the present invention, there is provided an image forming apparatus for forming an image of multilevel data, comprising at least two image forming means, each of the image forming means comprising driving means for driving an image forming element for image formation, additional data generating means for generating a digital signal string based on predetermined additional data, and input means for superposing a digital signal string related to the multilevel image data and the digital signal string based on the additional data and inputting the superposed digital signal string to the driving means.

According to the present invention, there is provided an image forming method of forming an image of multilevel image data by using an image forming element for image formation and driving means for driving the image forming means, the driving means having an input terminal for forcedly controlling light emission of the image forming element, comprising the steps of inputting a digital signal string related to the multilevel image data to the driving means, and generating a digital signal string based on predetermined additional data and inputting the digital signal string to the input terminal.

According to the present invention, there is provided an image forming method of forming an image of multilevel data by using at least two image forming elements for image formation and at least two driving means for driving the image forming elements, comprising the steps of generating a digital signal string based on predetermined additional data for each of the driving means, and superposing a digital signal string related to the multilevel image data and the digital signal string based on the additional data and inputting the superposed digital signal string to each of the driving means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 23 is a timing chart showing individual signals; and

FIG. 24 is a timing chart when a PWM unit 353 generates a PWM signal.

DETAILED DESCRIPTION OF THE PREFERRED EMBODIMENTS

Preferred embodiments of the present invention will now be described in detail in accordance with the accompanying drawings.

Figure 1:
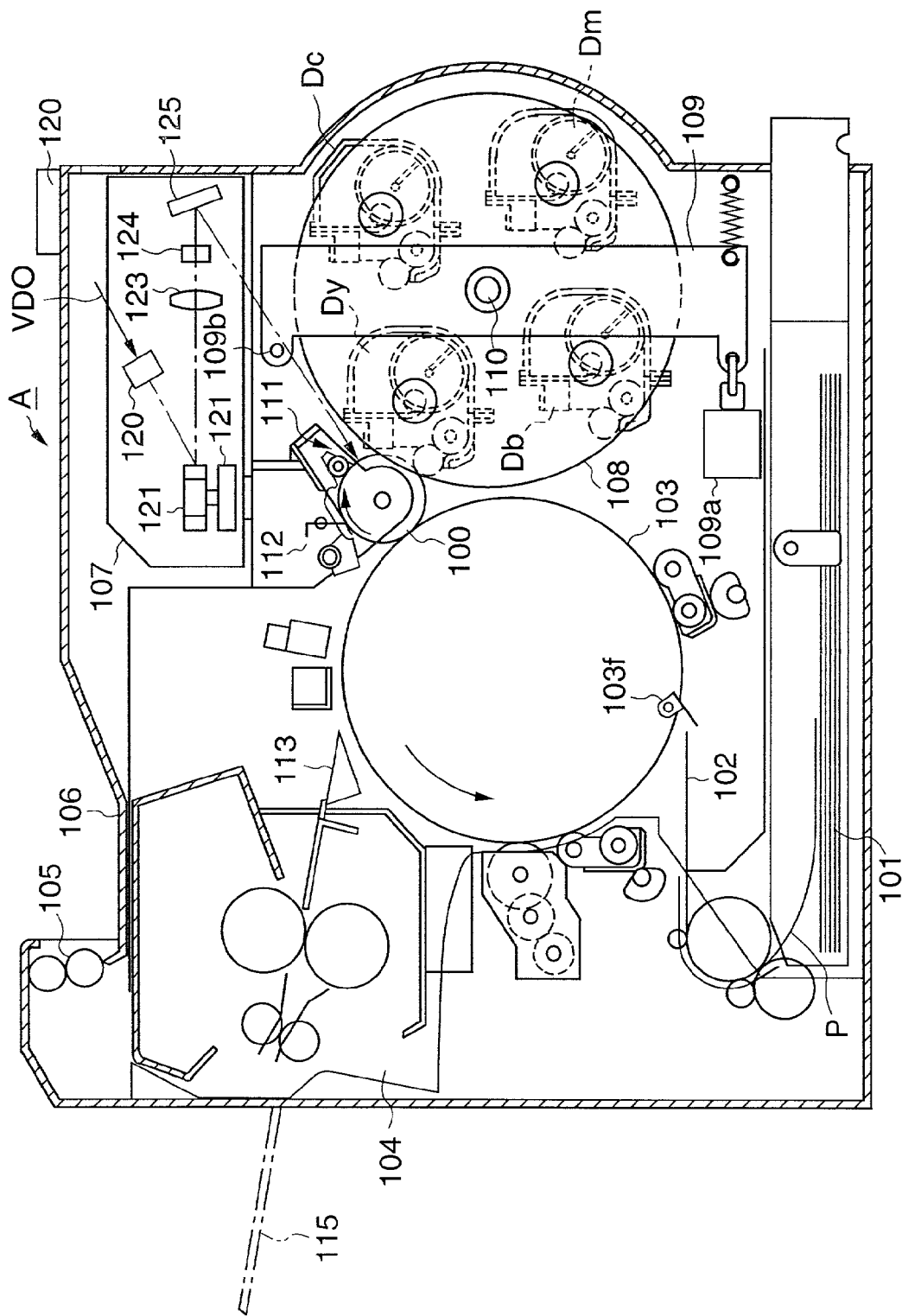
FIG. 1 is a sectional view showing the structure of an image forming apparatus A according to one embodiment of the present invention.

FIG. 1 is a sectional view showing the structure of an image forming apparatus A according to one embodiment of the present invention.

In this image printing apparatus A, a gripper 103f grips the leading edge of a paper sheet 102 fed from a paper feeder 101, holding the paper sheet 102 on the circumferential surface of a transfer drum 103.

Latent images formed by different colors on an image carrier 100 by an optical unit 107 are developed by developing devices (Dy, Dc, Dm, and Db) of the corresponding colors and transferred a plurality of times onto the paper sheet held on the circumferential surface of the transfer drum 103, thereby forming a multicolor image.

After that, the paper sheet 102 is separated from the transfer drum 103, fixed by a fixing unit 104, and delivered to a paper delivery tray 106 by a paper delivery unit 105.

Each developing device (Dy, Dc, Dm, or Db) has rotating shafts at its two ends and is held by a developing device selection mechanism 108 so as to be rotatable around the shafts.

Also, each developing device (Dy, Dc, Dm, and Db) is rotated to be selected with its posture maintained constant. After the selected developing device has moved to a development position, a selection mechanism holding frame 109 moves around a supporting point 109b by a solenoid 109a to position the developing device selection mechanism 108 and the developing device in the direction of the image carrier 100.

The operation of the image forming apparatus A constructed as above will be described below.

First, a charger 111 shown in FIG. 1 evenly charges the image carrier (photosensitive drum) 100 to a predetermined polarity. A first latent image of magenta is formed on this photosensitive drum 100 by exposure to a laser beam L.

In this case, a predetermined developing bias voltage is applied only to the magenta developing device Dm to develop the magenta latent image, forming a first toner image of magenta M on the photosensitive drum 100.

Meanwhile, a transfer paper sheet P is fed at a predetermined timing. Immediately before the leading edge of this transfer paper sheet P reaches the transfer start position described above, a transfer bias voltage (+1.8 KV) having a polarity (e.g., positive polarity) opposite to that of the toner is applied to the transfer drum 103. Consequently, the first toner image on the photosensitive drum 100 is transferred onto the transfer paper sheet P. At the same time, the transfer paper sheet P is electrostatically attracted to the surface of the transfer drum 103. After that, a cleaner 112 removes the residual magenta toner from the photosensitive drum 100 to prepare for the formation and development of a latent image of the next color.

Subsequently, the laser beam L forms a second latent image of cyan on the photosensitive drum 100. The cyan developing device Dc develops this second latent image on the photosensitive drum 100 to form a second toner image of cyan C.

This second toner image of cyan C is transferred onto the transfer paper sheet P so as to be aligned with the position of the first toner image of magenta M previously transferred onto the transfer paper sheet P. In the transfer of this toner image of the second color, a bias voltage of +2.1 KV is applied to the transfer drum 103 immediately before the transfer paper sheet reaches the transfer unit.

Similarly, third and fourth latent images of yellow and black are sequentially formed on the photosensitive drum 100 and sequentially developed by the developing devices Dy and Db, respectively. Third and fourth toner images of yellow and black thus formed are sequentially transferred so as to be aligned with the toner images previously transferred onto the transfer sheet P. As a consequence, the toner images of the four colors are formed to overlap each other on the transfer paper sheet P.

In the transfer of the toner images of the third and fourth colors, bias voltages of +2.5 and +3.0 KV, respectively, are applied to the transfer drum 103 immediately before the transfer paper sheet reaches the transfer unit. The transfer bias voltage is raised whenever a toner image of each color is transferred in order to prevent a lowering of the transfer efficiency.

A primary cause of a lowering of this transfer efficiency is that when the transfer paper sheet separates from the photosensitive drum 100 after transfer, air discharge charges the surface of the sheet to a polarity opposite to that of the transfer bias voltage (because air discharge slightly charges the surface of the transfer drum carrying the transfer paper sheet), and this electric charge builds up each time an image is transferred. If the transfer bias voltage is held constant, the transfer electric field lowers whenever transfer is performed.

Also, during the transfer of the fourth color described above, when (or immediately before or immediately after) the leading edge of the transfer paper sheet reaches the transfer start position, a DC bias voltage of +3.0 KV having the same polarity and same potential as the transfer bias voltage applied when the fourth toner image is transferred is superposed on an AC voltage of 5.5 KV (an effective value, the frequency is 500 Hz), and the resulting voltage is applied to the charger 111.

The charger 111 is thus operated when the leading edge of the transfer paper sheet reaches the transfer start position during the transfer of the fourth color in order to prevent uneven transfer. Especially in transfer of a full-color image, even slight transfer unevenness is conspicuous as a color difference. Therefore, it is necessary to apply a predetermined bias voltage to the charger 111 to perform discharge as described above.

After that, as the leading edge of the transfer paper sheet P on which the toner images of the four colors are transferred by superposition moves close to a separation position, a separation pawl 113 approaches, and its end portion comes in contact with the surface of the transfer drum 103 to separate the transfer paper sheet P from the transfer drum 103. The end portion of this separation pawl 113 keeps contacting the transfer drum surface until the trailing edge of the transfer paper sheet P separates. After that, the separation pawl 103 moves away from the transfer drum 103 and returns to the original position.

As described above, the charger 111 operates from the time the leading edge of the transfer paper sheet P reaches the transfer start position of the last color to the time the trailing edge of the transfer paper sheet P separates from the transfer drum 103. In this manner, the charger 111 removes stored charge (having a polarity opposite to that of the toner) on the transfer paper sheet to facilitate the separation of the transfer paper sheet by the separation pawl 113. Also, the charger 111 reduces air discharge during the separation of the transfer paper sheet.

Note that when the trailing edge of the transfer paper sheet reaches the transfer end position (the exit of a nip formed by the photosensitive drum 100 and the transfer drum 103), the transfer bias voltage (ground potential) to be applied to the transfer drum 103 is turned off. Simultaneously, the bias voltage applied to the charger 111 is turned off.

The transfer paper sheet P thus separated is conveyed to a fixing device 104 where the toner images on the transfer paper sheet are fixed. After that, the transfer paper sheet P is delivered onto the paper delivery tray 115.

The operation of laser beam scanning in the image forming apparatus A will be described below.

The optical unit 107 as a driving means comprises a semiconductor laser 120 as an image forming device (light-emitting device), a polygonal mirror 121, a scanner motor 122, a lens 123, and a mirror 125. When the printing sheet P is fed and its leading edge is detected, an image signal VDO of one page is output to the semiconductor laser 120 in synchronism with the detection.

The light beam L is modulated by the image signal VDO and emitted toward the polygonal mirror 125 which is rotated by the scanner motor 122. In this way the light beam L is guided to the photosensitive drum 100 by the lens 123 and the mirror 125. Also, when the light beam L is emitted, a detector (not shown) placed on the scanning axis detects this light beam L and outputs a beam detection signal BD as a horizontal sync signal. Consequently, the light beam L exposes the photosensitive drum 100 by scanning in synchronism with the BD signal to form an electrostatic latent image.

Figure 2:
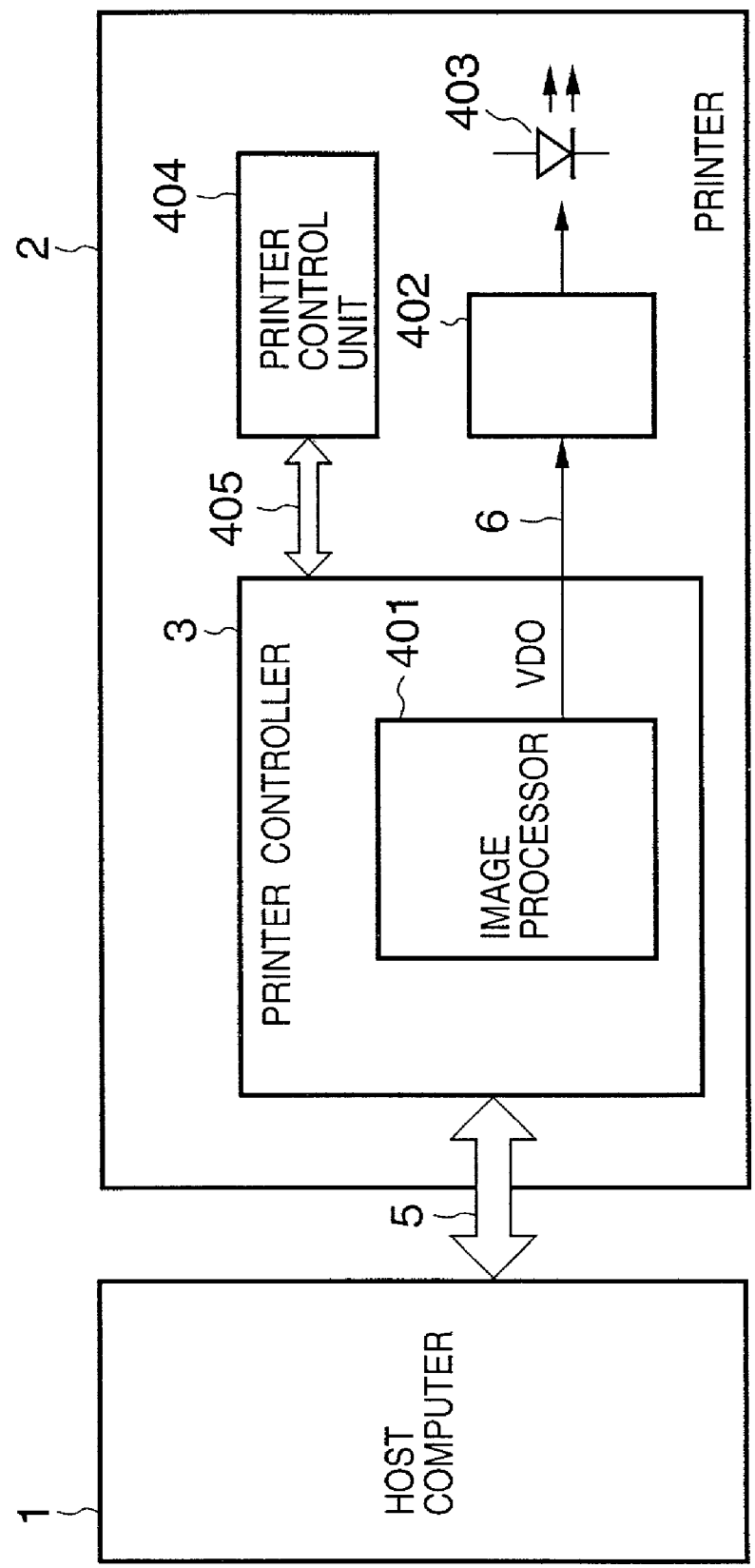
FIG. 2 is a block diagram showing an outline of the arrangement of a printing system using the image forming apparatus A.

FIG. 2 is a block diagram showing an outline of the arrangement of a printing system using the image forming apparatus A. As shown in FIG. 2, a printer 2 (image forming apparatus A) comprises a printer controller 3 for rasterizing image information in a predetermined descriptive language supplied from a host computer 1, and a printer engine including a printer control unit 404 and a signal processor 402.

The host computer 1 also supplies bit data of, e.g., RGB read by an image reader or the like.

An image processor 401 in the printer controller 3 converts an RGB image into a YMCK image and performs pulse width modulation and dither processing for data by using the multilevel image, thereby generating a VDO signal 6 as a 1-bit image data string.

Figure 3:
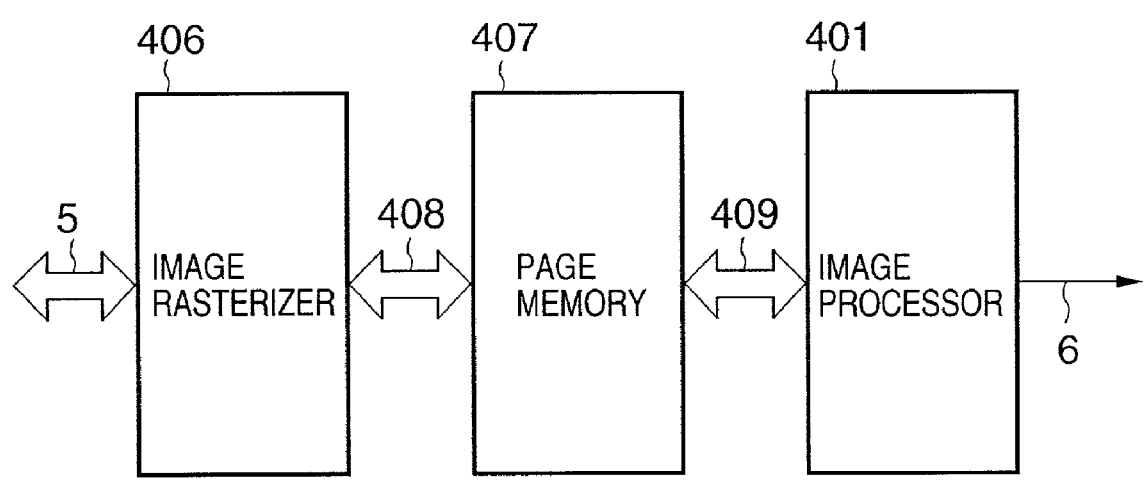
FIG. 3 is an internal block diagram of a printer controller 3.

FIG. 3 is an internal block diagram of the printer controller 3. As shown in FIG. 3, this printer controller 3 comprises an image rasterizer 406, a page memory 407, and the image processor 401. The image rasterizer 406 converts information of a printer language supplied from the host computer 1 into bit map data. The page memory 407 stores the data of one page. The image processor 401 converts RGB information supplied from the page memory into YMCK information and generates the VDO signal 6 converted to have a pulse width corresponding to the multilevel density. This VDO signal 6 is one hard signal. The image processor 401 can be controlled by a clock signal corresponding to one dot of 600 Dpi as printing dots.

Figure 4:
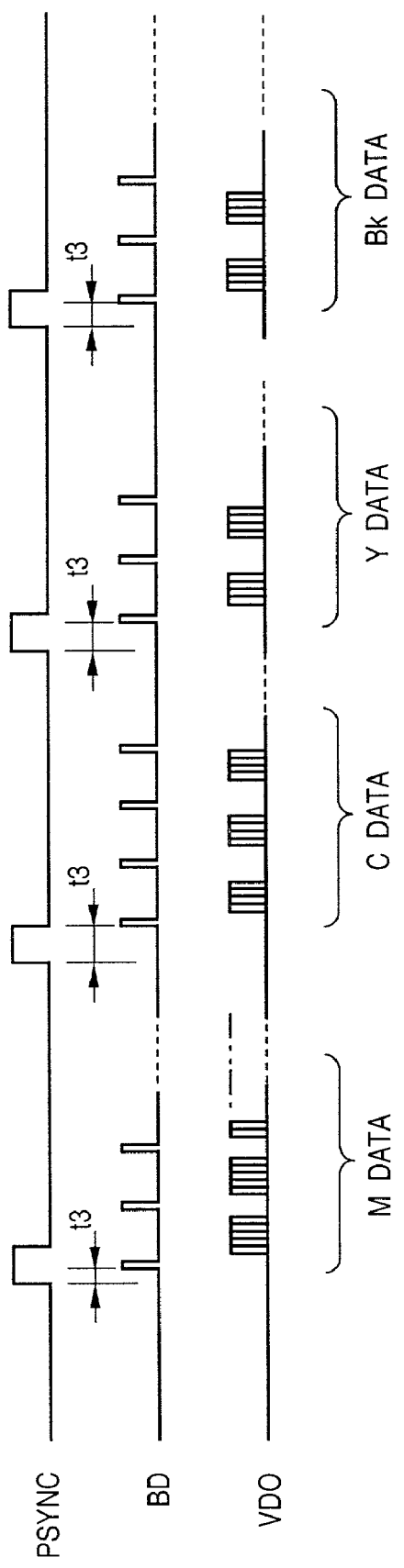
FIG. 4 is a timing chart showing a VDO signal 6, a BD signal 423 as a horizontal sync signal, and a PSYNC signal 424 as a vertical sync signal.

FIG. 4 is a timing chart showing the VDO signal 6 supplied from the printer controller 3, a BD signal 423 as a horizontal sync signal supplied from the engine to the printer controller, and a PSYNC signal 424 as a vertical sync signal. As shown in FIG. 4, magenta data, cyan data, yellow data, and black data are output in this order in synchronism with the PSYN signal 424.

Figure 5:
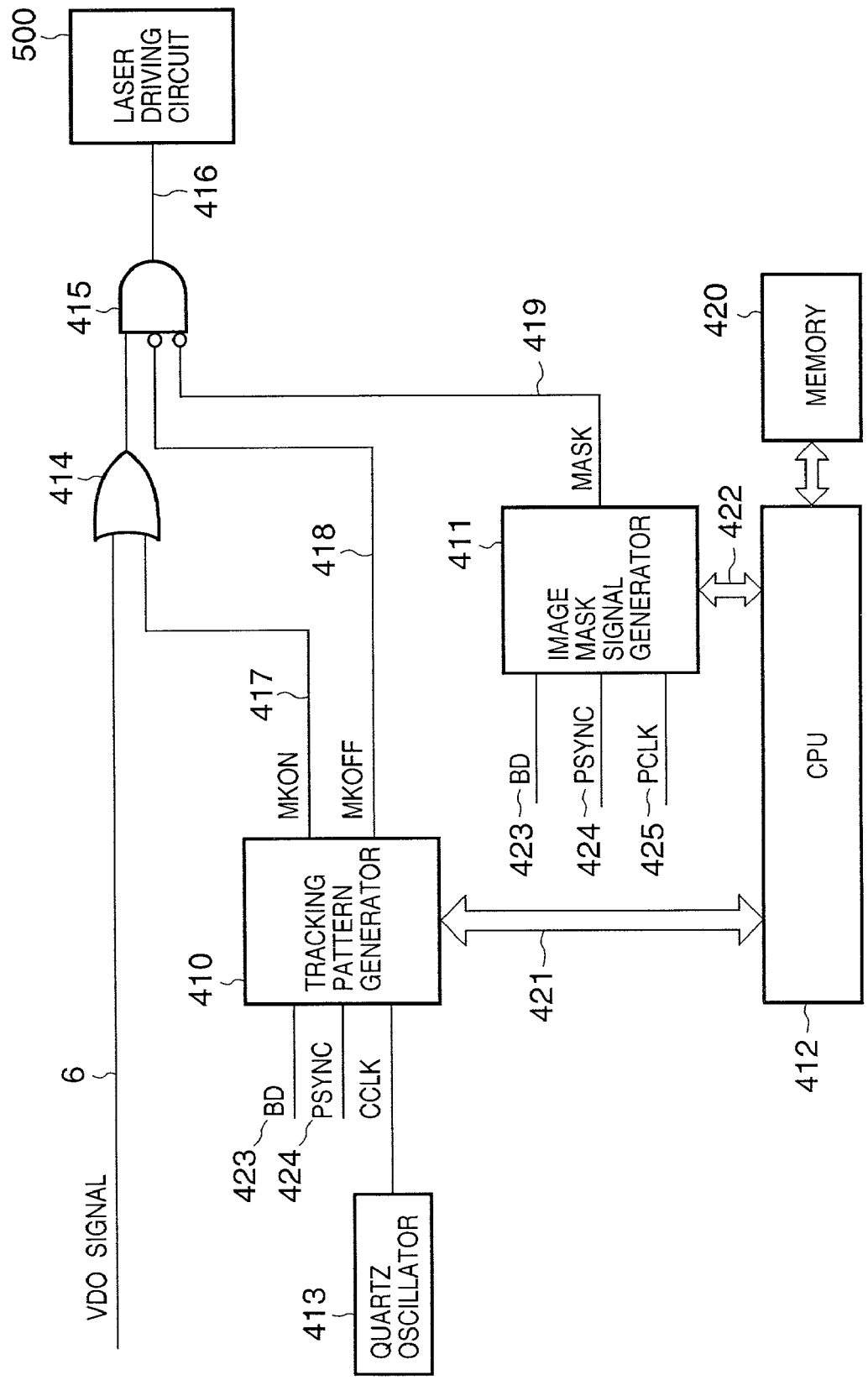
FIG. 5 is an internal block diagram of a signal processor 402 of an engine.
Figure 12:
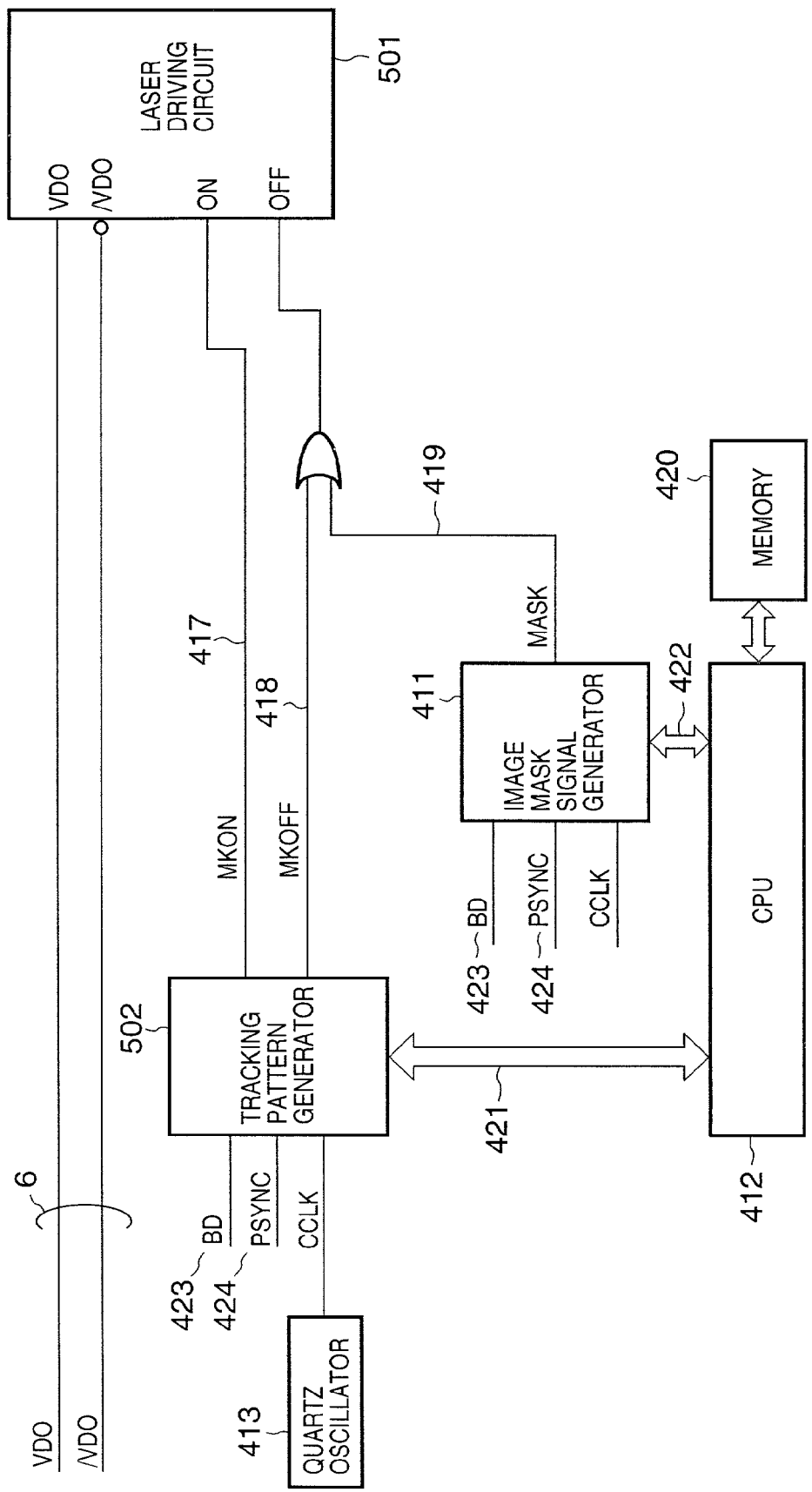
FIG. 12 is an internal block diagram of another signal processor 402 of the engine.
Figure 14:
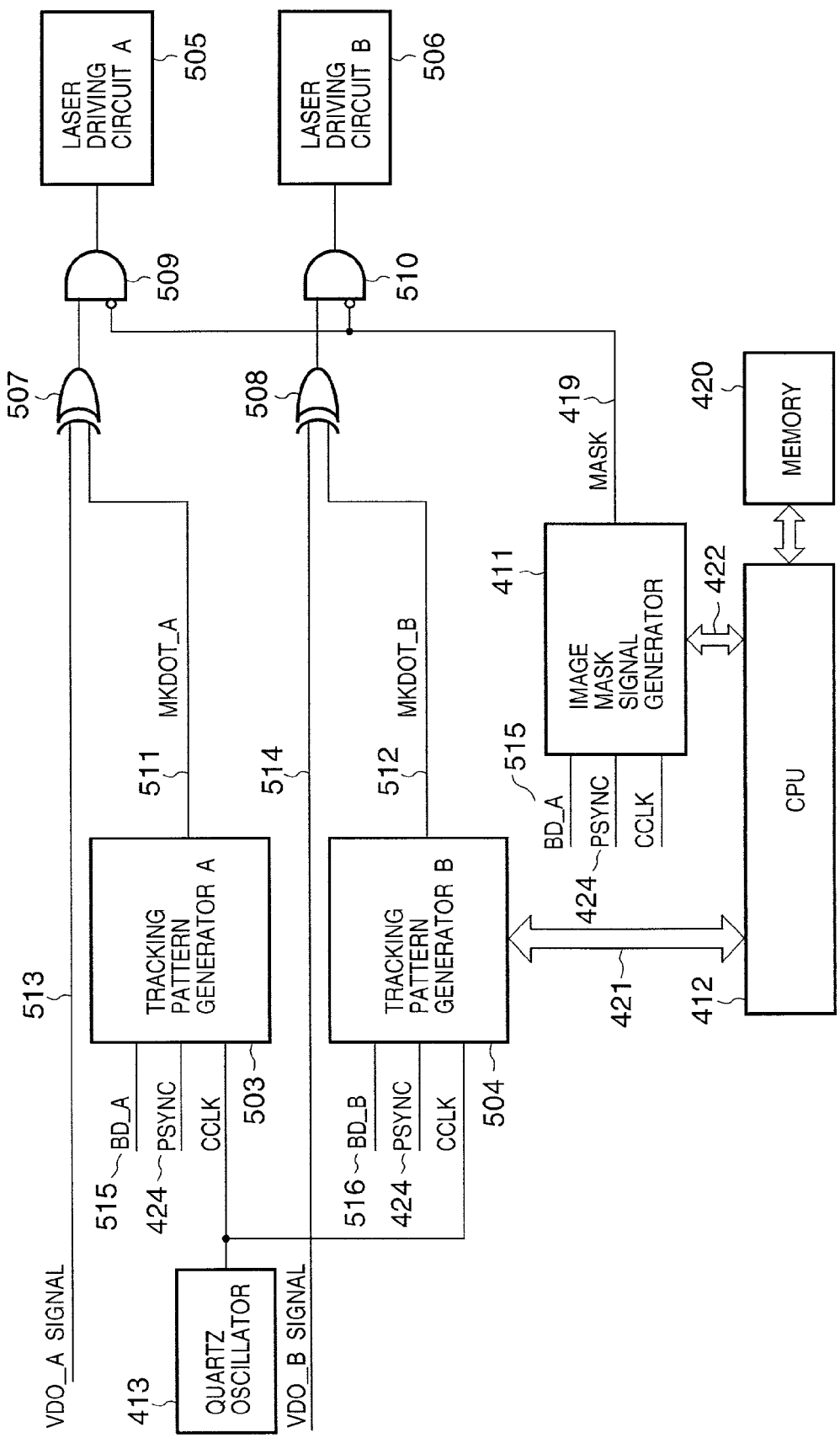
FIG. 14 is an internal block diagram of still another signal processor 402 of the engine.

FIGS. 5, 12, and 14 are internal block diagrams showing examples of the signal processor 402 of the engine. The example shown in FIG. 5 will be described first.

The VDO signal 6 supplied from the printer controller 3 is transferred to a laser driving circuit 500 via an OR gate 414 and an AND gate 415.

An image mask signal generator 411 is a block for generating a MASK signal 419 as a control signal for forcedly turning off a laser outside a printing region.

This MASK signal is "1" outside a printing region and "0" in a printing region. The MASK signal is generated on the basis of the BD signal and PSYNC signal by receiving desired information from a CPU 412.

A tracking pattern generator 410 as an additional data generating means is a block for generating a signal by which dots representing a number unique to the machine are printed on printed matter by yellow toner difficult to see. A code is expressed by the arrangement of this tracking pattern on printed matter.

The tracking pattern generator 410 receives an output clock signal CCLK from a quartz oscillator 413 installed in the engine, the BD signal 423, and the PSYNC signal 424, and generates a signal MKON for forcedly turning on the laser and a signal MKOFF for forcedly turning off the laser. These signals MKON and MKOFF can be asynchronous to the VDO signal 6 from the printer controller 3.

Note that the tracking pattern generator 410 is given arrangement information 421 of the tracking pattern by the CPU 412. The CPU 412 reads out a number unique to the machine from a memory 420 and encodes the number to generate the arrangement information 421 of the tracking pattern.

Note also that this tracking pattern is added to the VDO signal 6 when a yellow plane is printed; the tracking pattern is desirably not added in a plane of another color.

Figure 6:
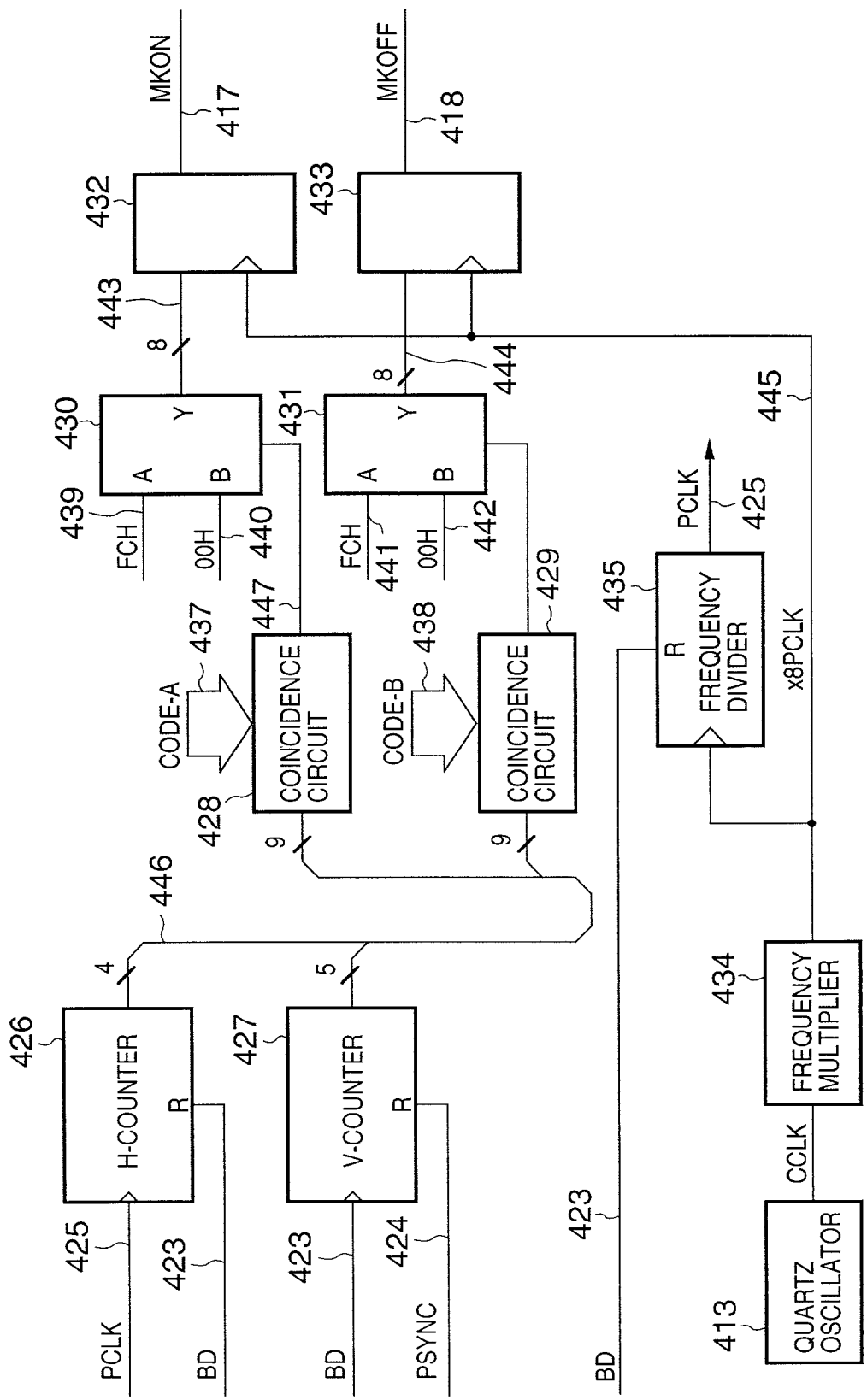
FIG. 6 is an internal block diagram of a tracking pattern generator 410.

FIG. 6 is an internal block diagram of the tracking pattern generator 410 shown in FIG. 5.

The frequency of the clock CCLK of the quartz oscillator 413 is the same as or close to the image transfer rate of the printer controller 3.

Figure 7:
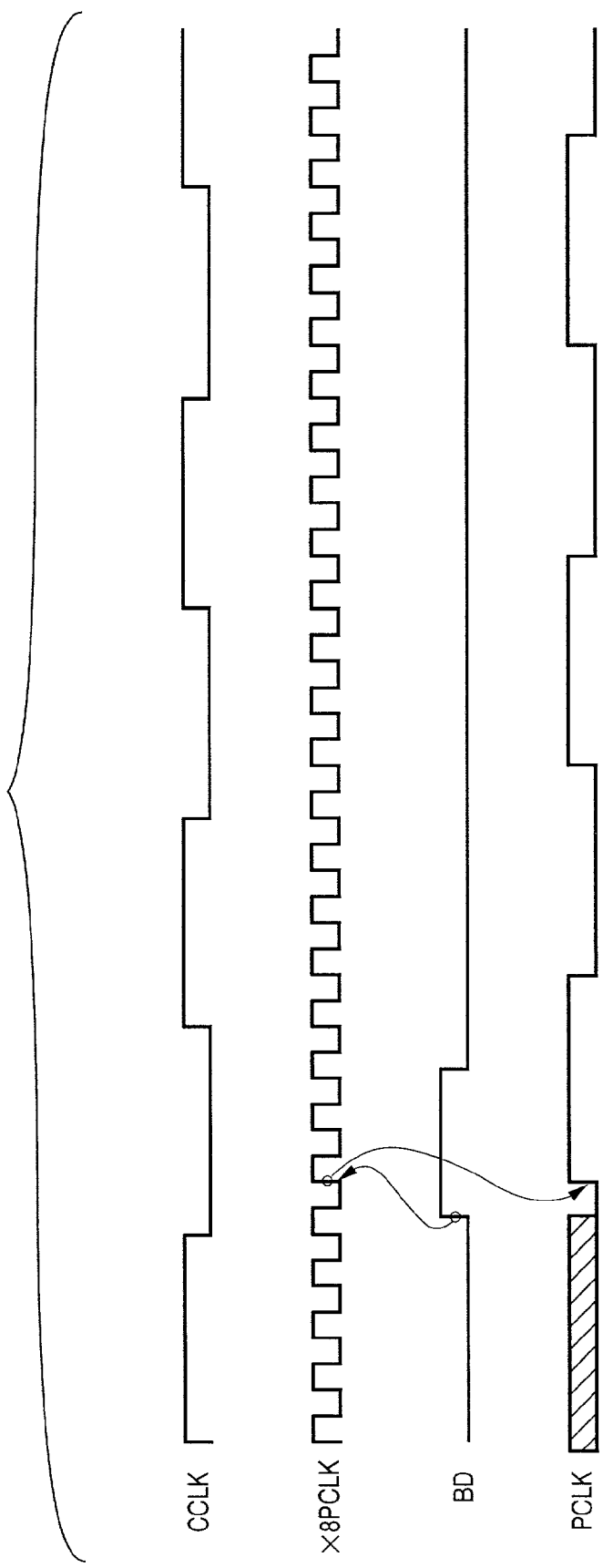
FIG. 7 is a timing chart showing PCLK signal generation in the tracking pattern generator 410.

The frequency of this CCLK signal is multiplied by 8 by a frequency multiplier 434. A clock signal 445 having this eightfold frequency is output to shift registers 432 and 433 and a frequency divider 435. In synchronism with the leading edge of the BD signal 423, the frequency divider 435 generates a clock PCLK, which synchronizes with the BD signal, at the same frequency as the quartz oscillator 413. FIG. 7 is a timing chart showing these signals.

A counter 426 is a 4-bit counter for counting the image clocks PCLK in a main scan direction. This counter 426 is reset by the BD signal 423 to start counting from 0h to Bh repeatedly.

A counter 427 is a 5-bit counter for counting the BD signal 423 in a sub-scan direction. This counter 427 is reset by the PSYNC signal 424 to start counting from 0h to 1Fh repeatedly.

An output signal 426 from these counters is information representing the coordinates of a printed dot. If coincidence circuits 428 and 429 in the subsequent stage determine that the information is a desired coordinate position, coincidence signals 447 and 448 are "1". Selectors 430 and 431 select A inputs if the coincidence signals 447 and 448 are "1", select B inputs if the coincidence signals 447 and 448 are "0", and output the A or B inputs from Y.

Figure 10:
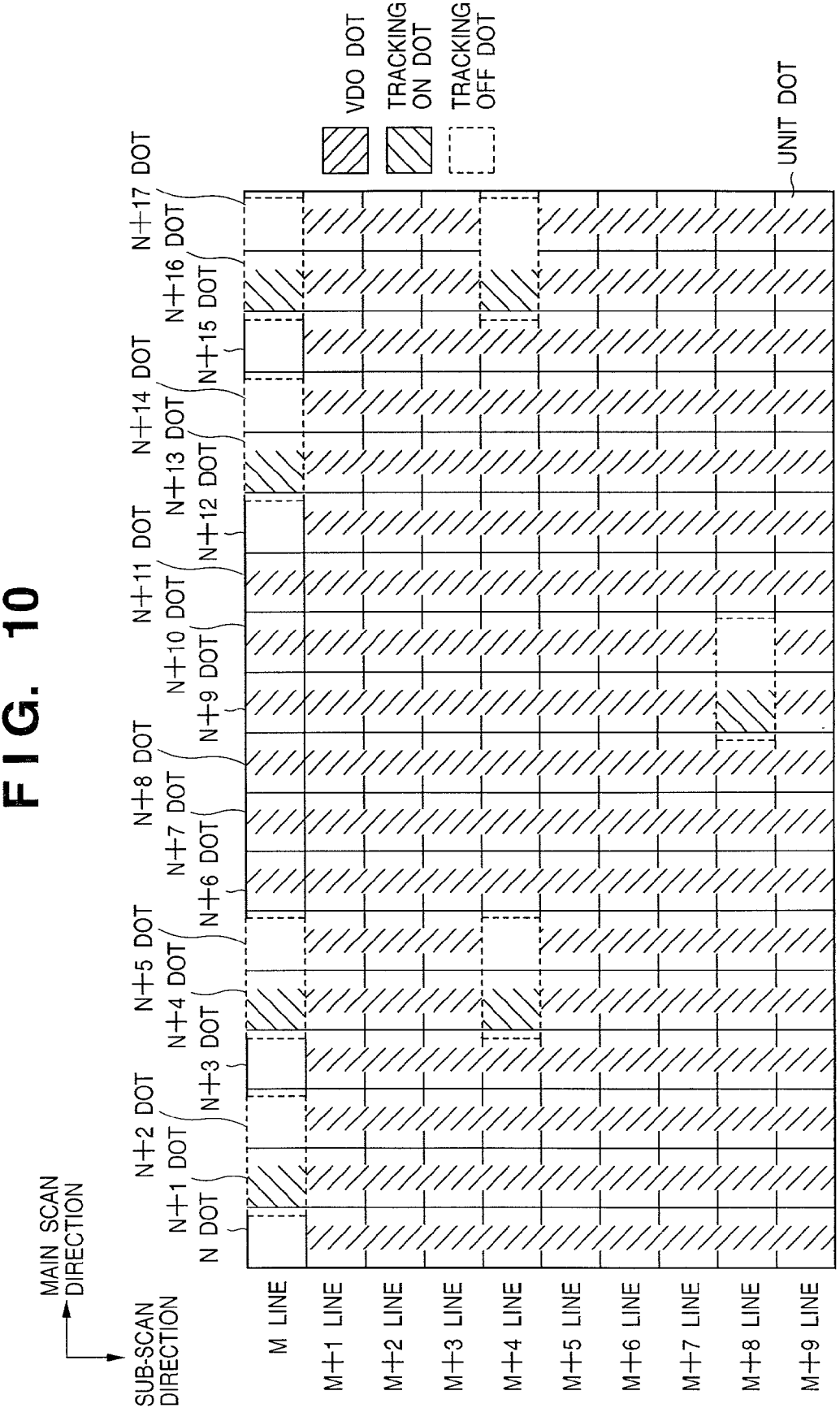
FIG. 10 is a view showing an image printed by mixing the tracking pattern shown in FIG. 9 into the VDO image signal 6.

As shown in FIG. 10, the basic pixels of the tracking pattern are such that forced OFF dots are arranged on the two sides of a forced ON dot. The selector 430 in FIG. 6 outputs multilevel information 443 which indicates a forced ON dot, i.e., outputs FCh at a timing at which a forced ON dot is printed and outputs 00h in other cases. The selector 431 outputs multilevel information 444 which indicates a forced OFF dot, i.e., outputs F8h at a timing at which a forced OFF dot is printed and outputs 00h in other cases. The output 8-bit signals from these selectors are converted into serial data output by parallel-serial converters 432 and 433.

Coordinate data (437 and 438) for printing tracking patterns to be set in the coincidence circuits are previously set by a CPU (not shown).

Note that the circuit for mixing the tracking pattern in the VDO signal can also be an EX-OR gate, rather than an AND gate or an OR gate. When this is the case, tracking dots are not constituted by forced ON and OFF dots; they form an inverted print of an original image.

Another example of the signal processor 402 shown in FIG. 12 will be described below.

The difference from FIG. 5 is that the tracking pattern is neither ANDed nor ORed in the input stage of a laser driving circuit 501 but superposed on an image signal by using terminals (a forced ON port ON and a forced OFF port OFF) which the laser driving circuit 501 has to forcedly control a laser.

In the example shown in FIG. 12, the image signals 6 supplied from the printer controller 3 are operation signals /VDO and VDO.

Figure 13:
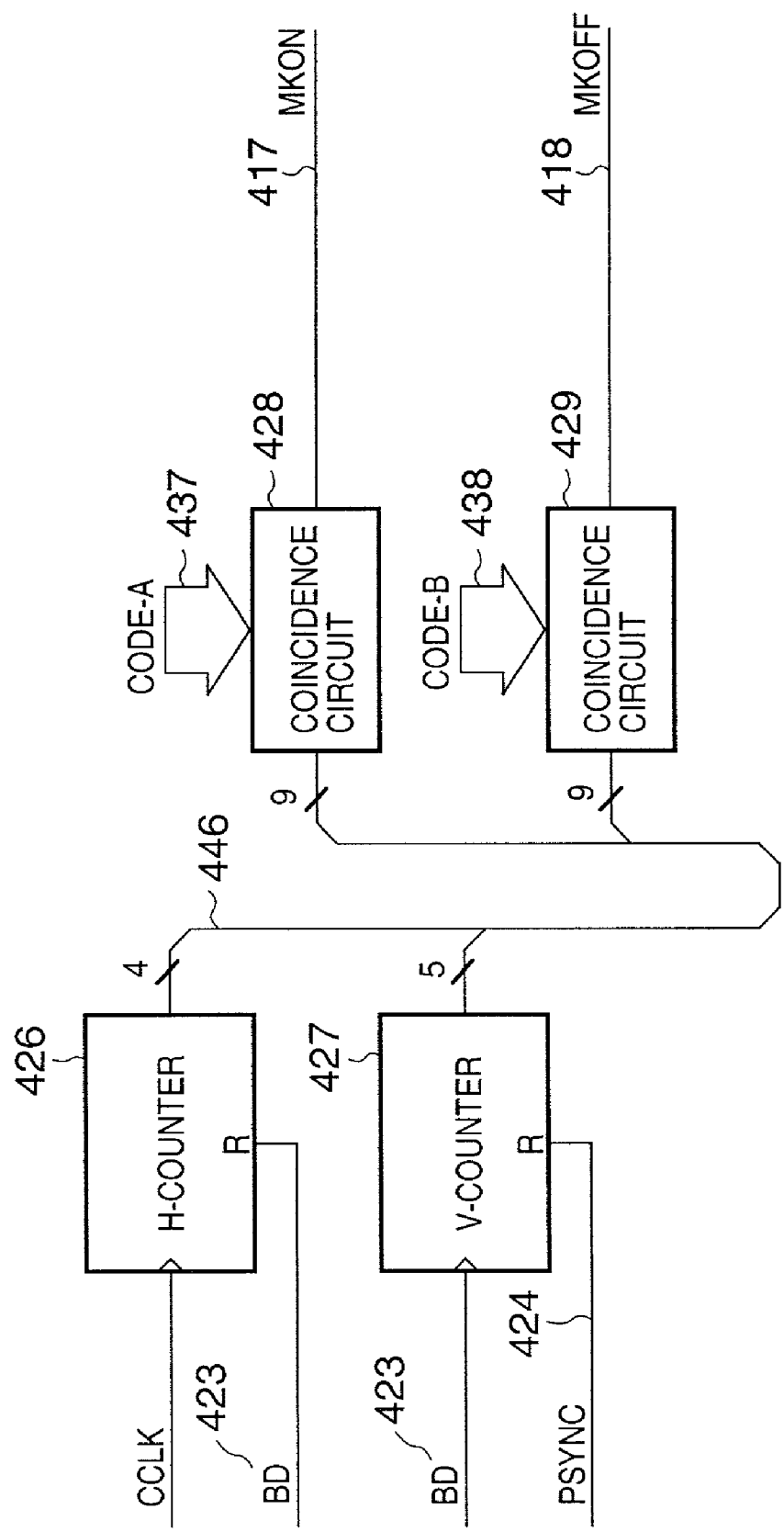
FIG. 13 is an internal block diagram of a tracking pattern generator 502.

FIG. 13 is an internal block diagram of a tracking pattern generator 502 shown in FIG. 12. Referring to FIG. 13, a tracking pattern is generated by a clock from a quartz oscillator 413, so the tracking pattern has jitter of one clock. Also, since dots forming the tracking pattern are controlled in units of dots, no P-S converter is necessary. As described above, the circuit shown in FIG. 12 is simple and hence can be realized at low cost.

Still another example of the signal processor 402 shown in FIG. 14 will be described below.

This example is an embodiment of a laser beam printer which performs laser scan in a main scan direction by using two or more lasers (in this example, two).

As shown in FIG. 14, exclusive OR (EX-OR) gates 507 and 508 for superposing tracking patterns are placed before laser driving circuits 505 and 506 for driving the lasers.

Figure 15:
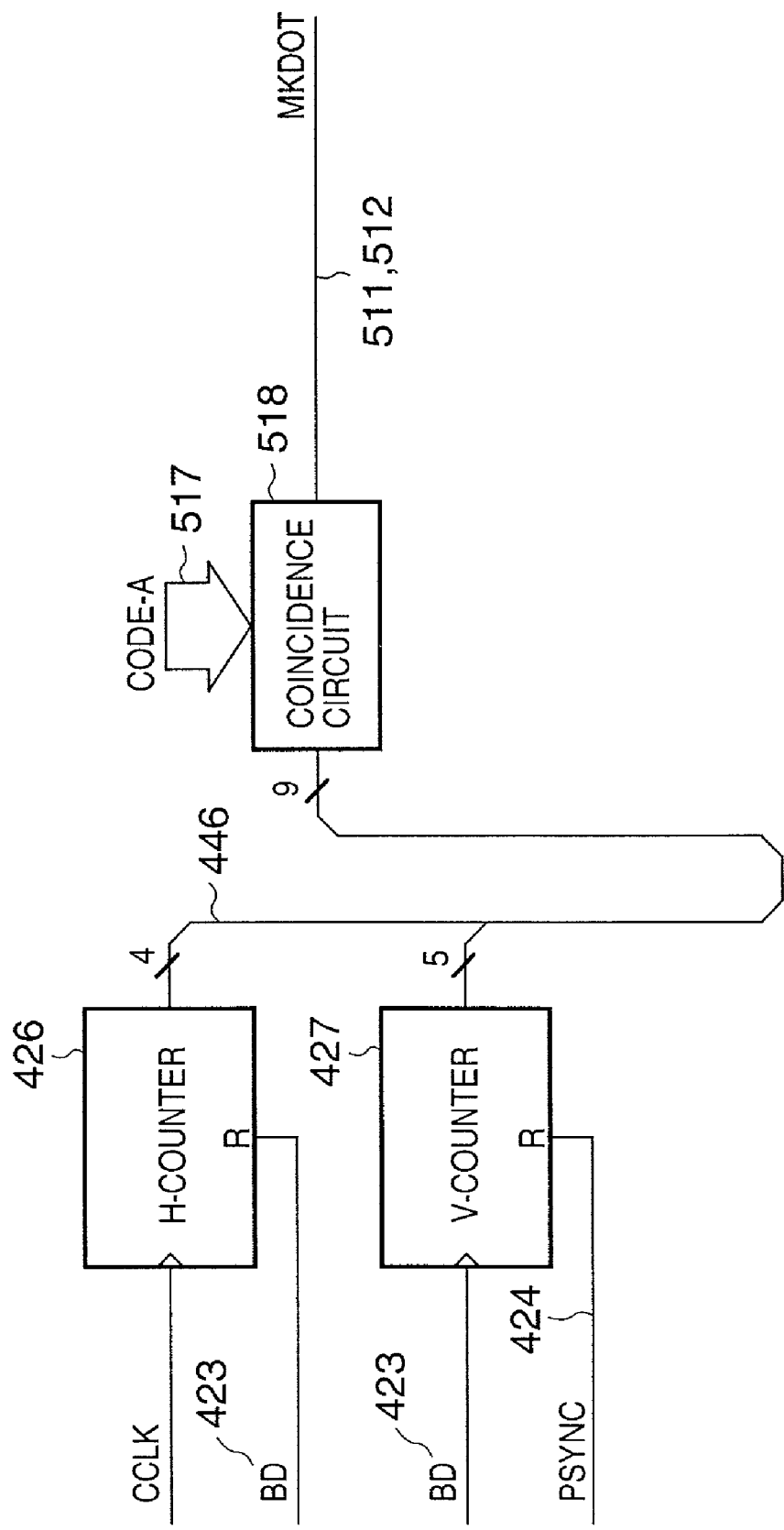
FIG. 15 is an internal block diagram of tracking pattern generators 503 and 504.

FIG. 15 is an internal block diagram of tracking pattern generators 503 and 504. In this example, tracking patterns are expressed by inverting image data VDO 513 and 514. So, output signals are only MKOT 511 and 512.

Figure 8:
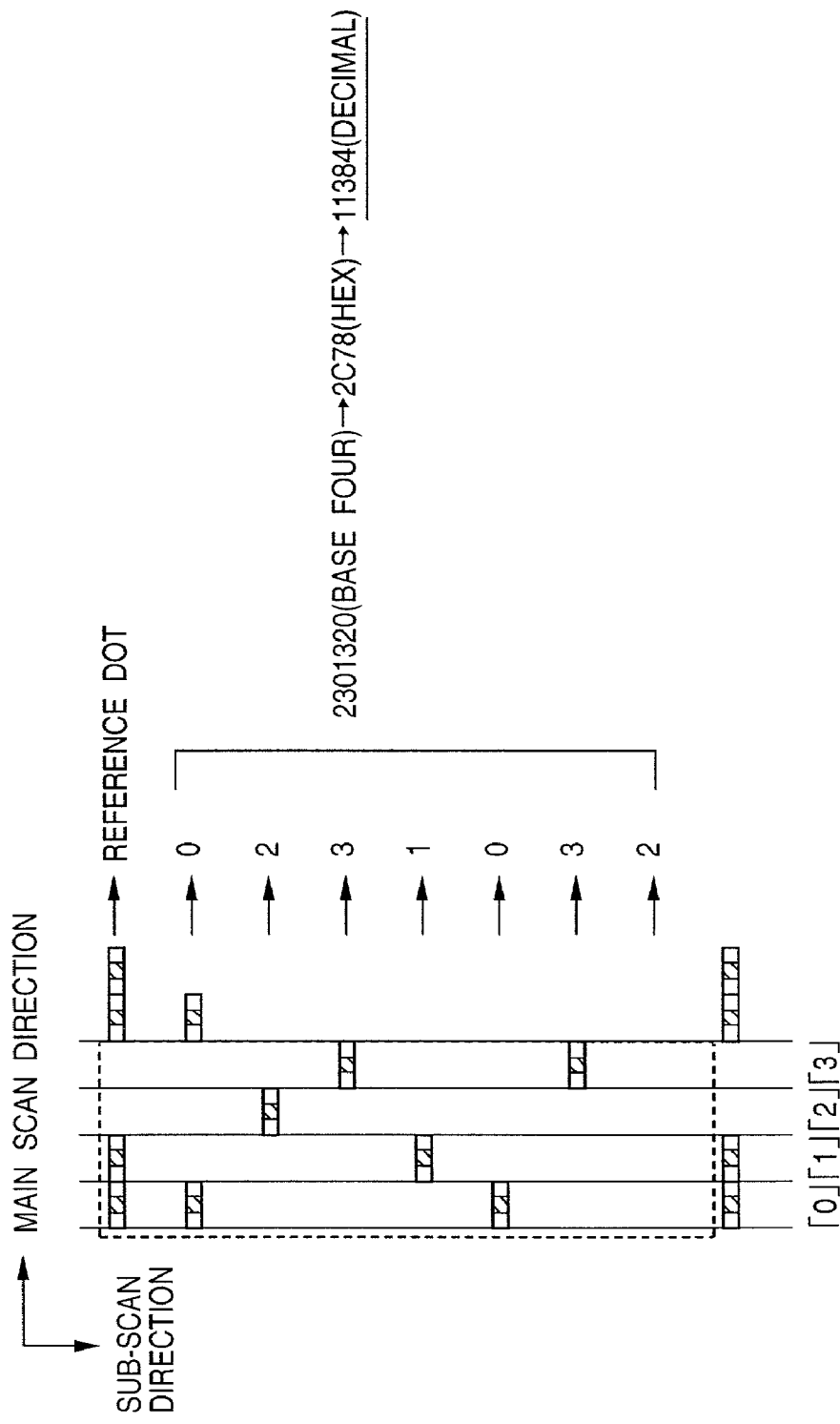
FIG. 8 is a schematic view showing a unit region representing a number unique to the machine by a tracking pattern.

FIG. 8 is a view schematically showing a unit region representing a number unique to the machine by using tracking patterns. As shown in FIG. 8, a predetermined code is expressed by nine patterns in a region indicated by the broken lines. Of these nine patterns, two patterns are reference patterns. The positions of the seven remaining patterns represent codes "0" to "3" (two bits), so these seven patterns express a total of 14 bits; in decimal notation, 0 to 16383. FIG. 8 expresses 11384. This pattern is repeated in the main scan and sub-scan directions.

Figure 9:
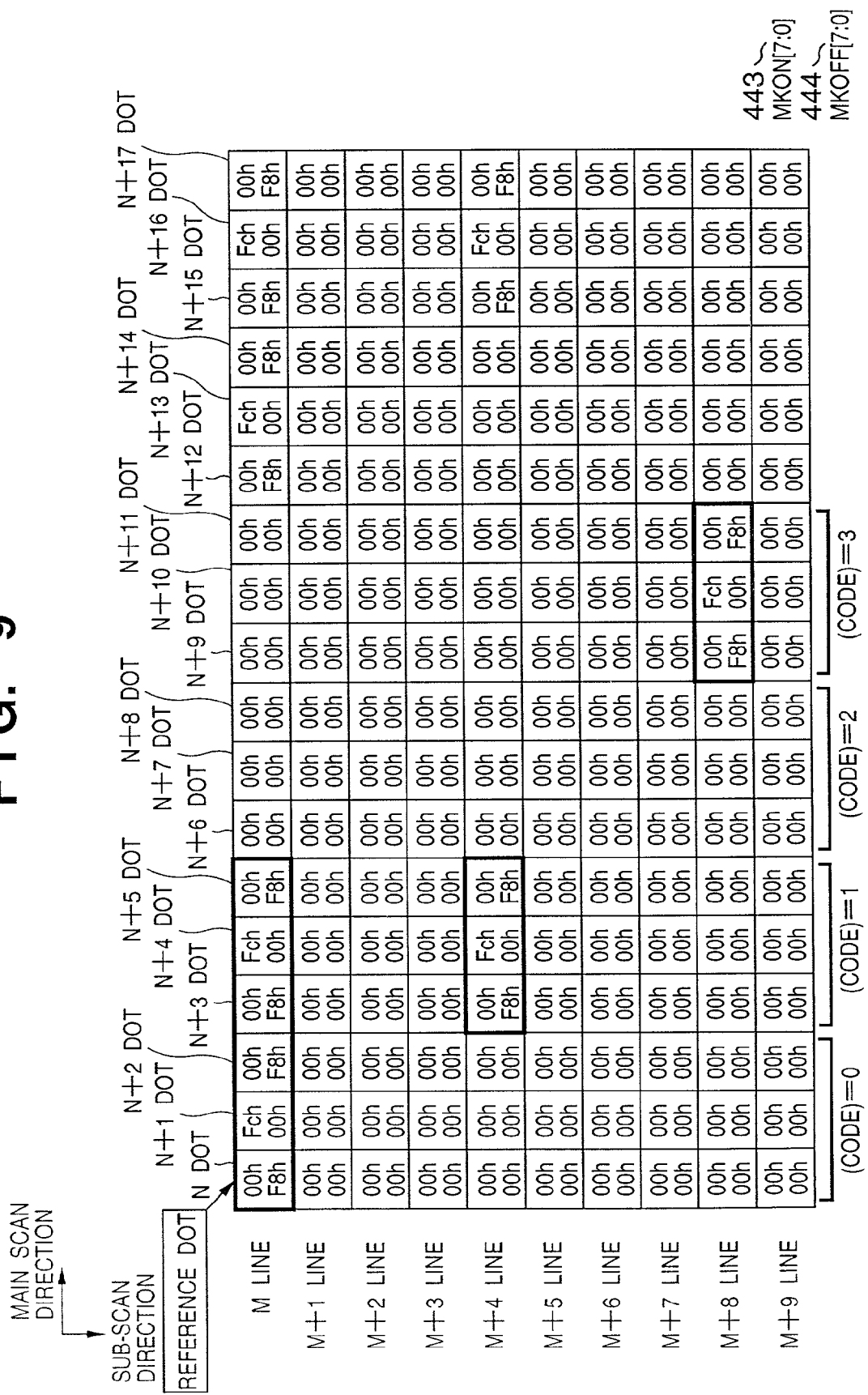
FIG. 9 is a view showing examples of MKON[7:0] 443 and MKOFF[7:0] 444 as multilevel signals of tracking pattern dots generated by the tracking pattern generator 410.

FIG. 9 shows examples of the MKON[7:0] 443 and MKOFF[7:0] 444 as multilevel signals of tracking pattern dots generated by the tracking pattern generator 410.

In FIG. 9, if MKON[7:0] is FCh, 11111100B is converted into serial data and output as MKON to the OR gate 414 (not shown). That is, a ⅙ dot of one dot is forcedly printed. If MKOFF[7:0] is F8h, 11111000B is converted into serial data and output as MKOFF to the AND gate 415 (not shown). That is, a ⅝ dot of one dot is forcedly printed. If the signal is 00h, the VDO signal 6 is directly output to a laser driver. Also, this tracking pattern is printed every four lines.

FIG. 10 is a view showing an image printed by mixing the tracking pattern shown in FIG. 9 into the image signal VDO 6. In FIG. 10, the VDO data 6 output from the printer controller is in phase with the tracking pattern. That is, the frequency of the control clock of the image processor 401 in the printer controller 3 perfectly matches the frequency of the control clock CCLK of the tracking pattern generator 410. Assume that the VDO signal is printing an even intermediate density.

Figure 11:
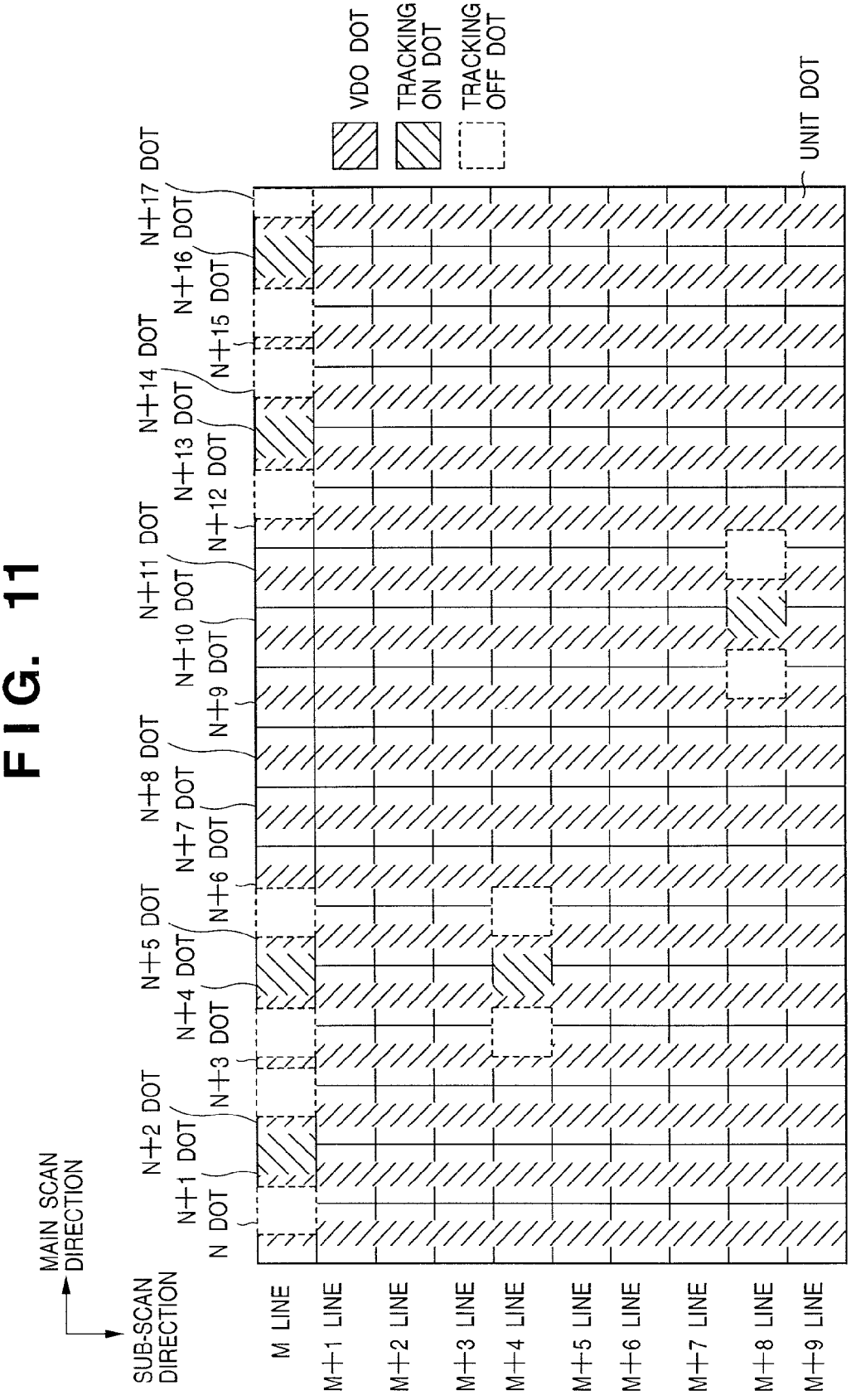
FIG. 11 is a view showing a case in which the output VDO data 6 from the printer controller is not in synchronism with the tracking pattern.

FIG. 11 is a view when the output VDO data 6 from the printer controller is not in synchronism with the tracking pattern. That is, the frequency of the control clock of the image processor 401 in the printer controller does not perfectly match the frequency of the control clock CCLK of the tracking pattern generator 410.

This can happen because, as described earlier, both of the printer controller 3 and the tracking pattern generator 410 of the engine have a circuit for generating a clock signal synchronized with the horizontal sync signal BD. Referring to FIG. 11, the frequency of the control clock CCLK of the tracking pattern generator 410 is 1/1.5 the frequency of the control clock of the image processor 401.

As a modification of this embodiment, the frequency of the quartz oscillator of the engine can be made different from the image transfer rate of the controller. If a quartz oscillator having a frequency several times as high as the image transfer rate is used, the frequency multiplier 434 is unnecessary. Also, a frequency lower than the image transfer rate can be multiplied by the frequency multiplier 434 to obtain a clock having a desired frequency.

Figure 16:
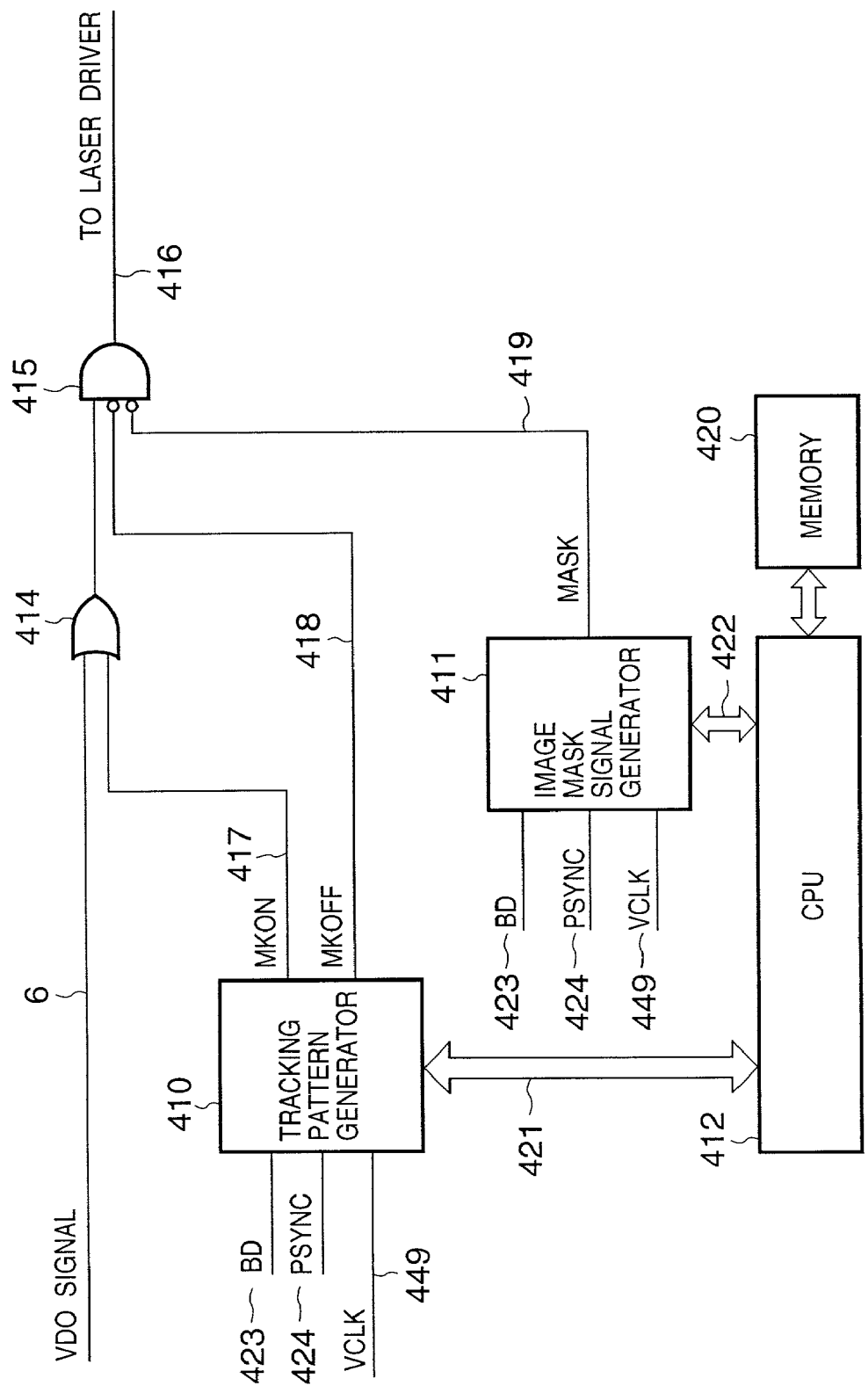
FIG. 16 is an internal block diagram of still another signal processor 402 of the engine.

FIG. 16 is an internal block diagram of the signal processor 402 in this case. The difference from the above case is that instead of a quartz oscillator being included in the engine, an image transfer clock signal VCLK 449 of the printer controller is output from the engine and used in the tracking pattern generator.

Figure 17:
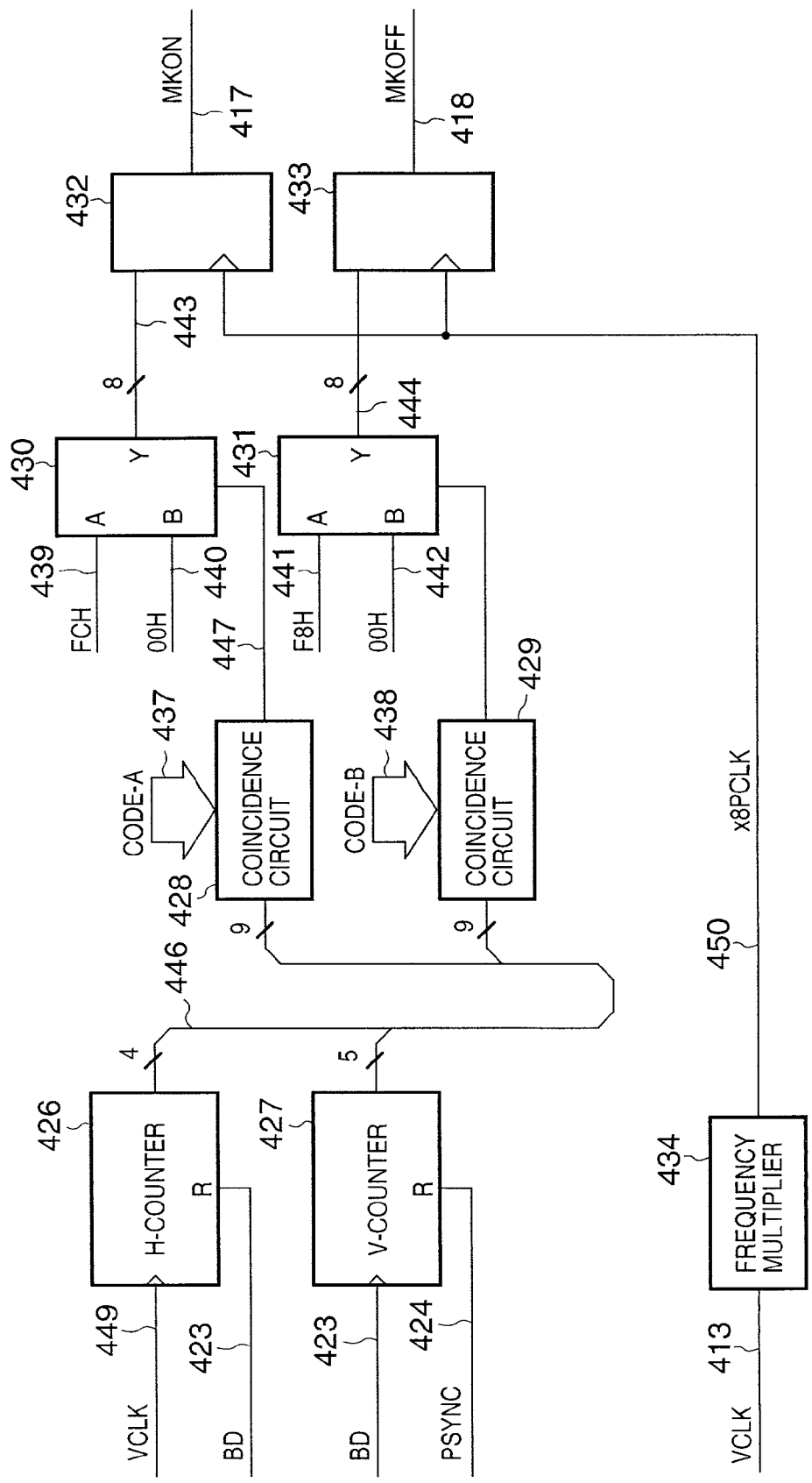
FIG. 17 is an internal block diagram of another tracking pattern generator 410.
Figure 18:
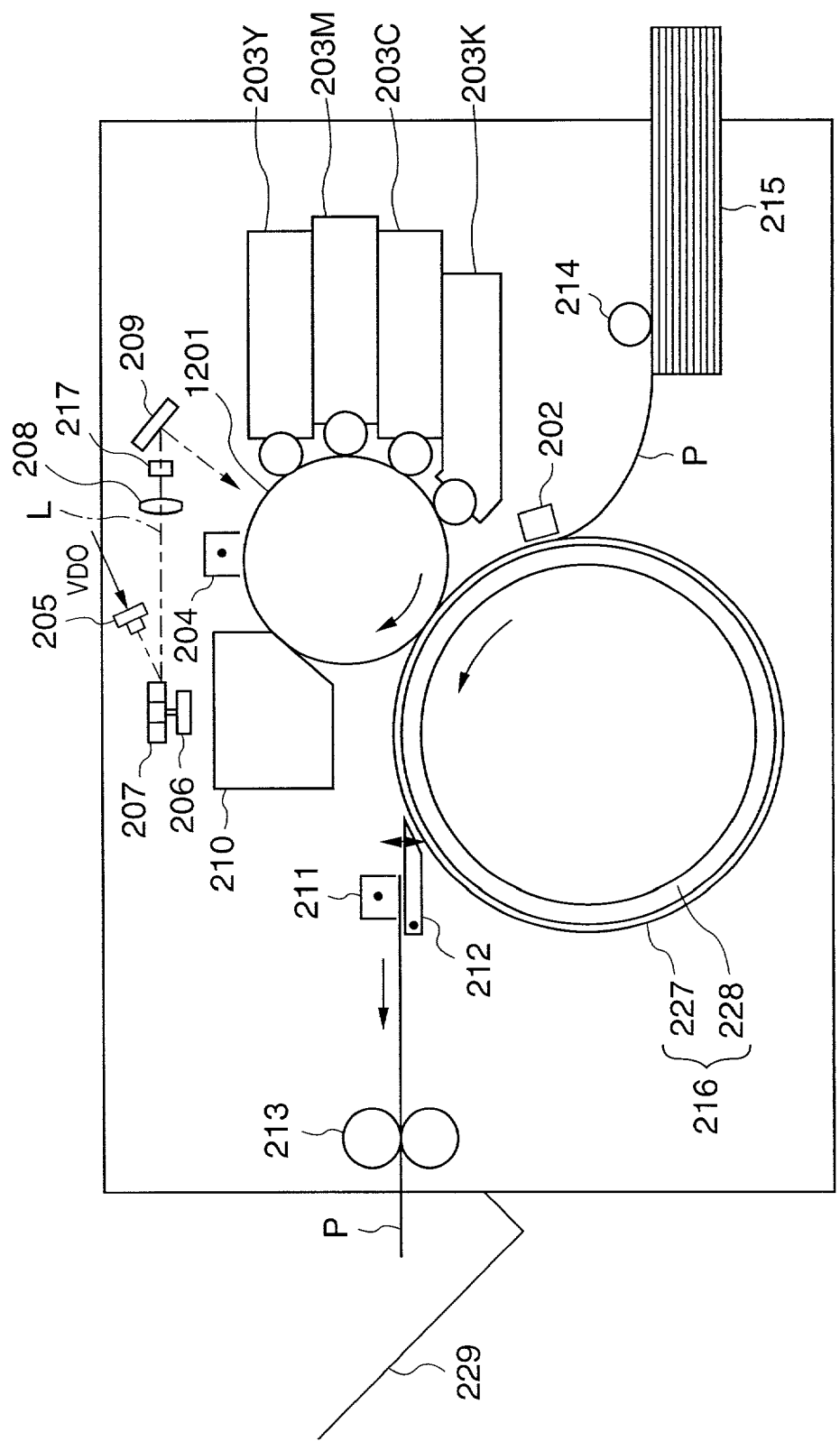
FIG. 18 is a schematic view of a conventional multicolor beam printer.
Figure 19:
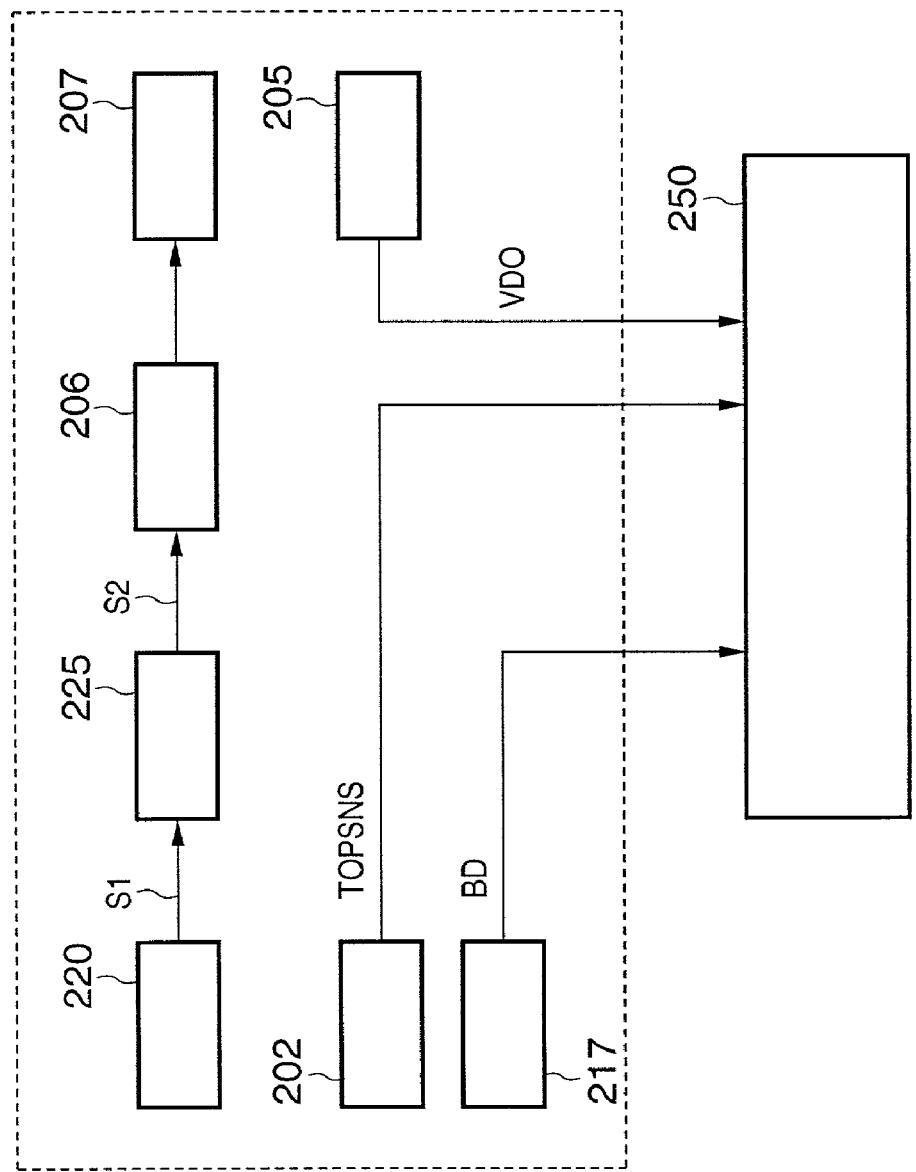
FIG. 19 is a block diagram of signal processing.
Figure 20:
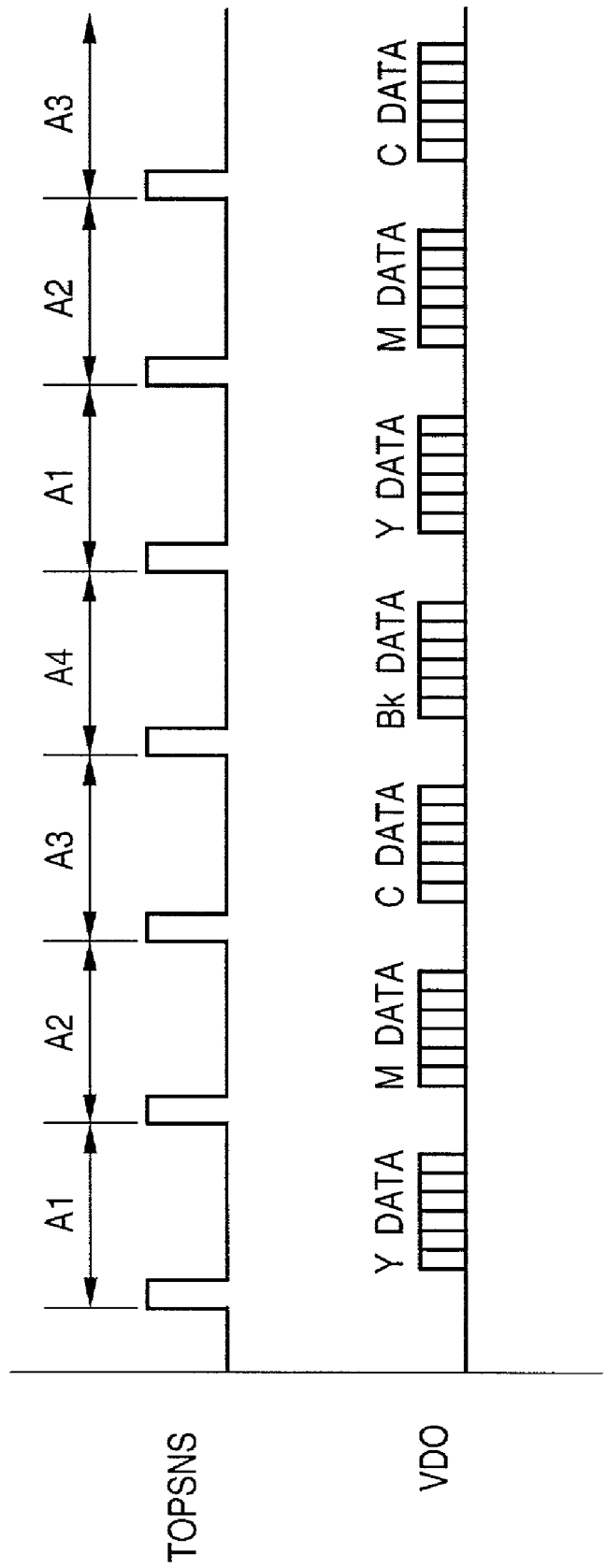
FIG. 20 is a timing chart showing the relationship between a TOPSNS signal and a VDO signal.
Figure 21:
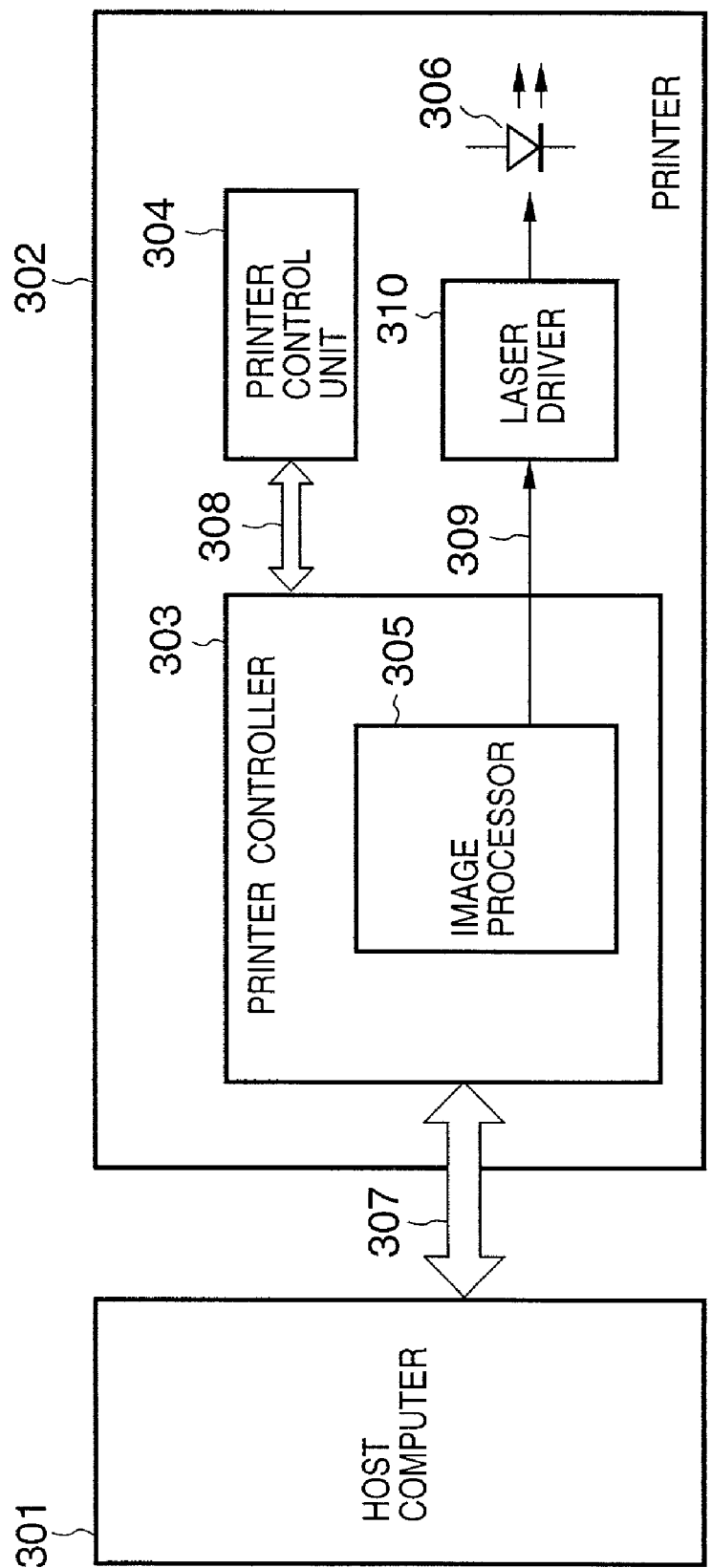
FIG. 21 is a block diagram showing the system configuration of a conventional printer.
Figure 22:
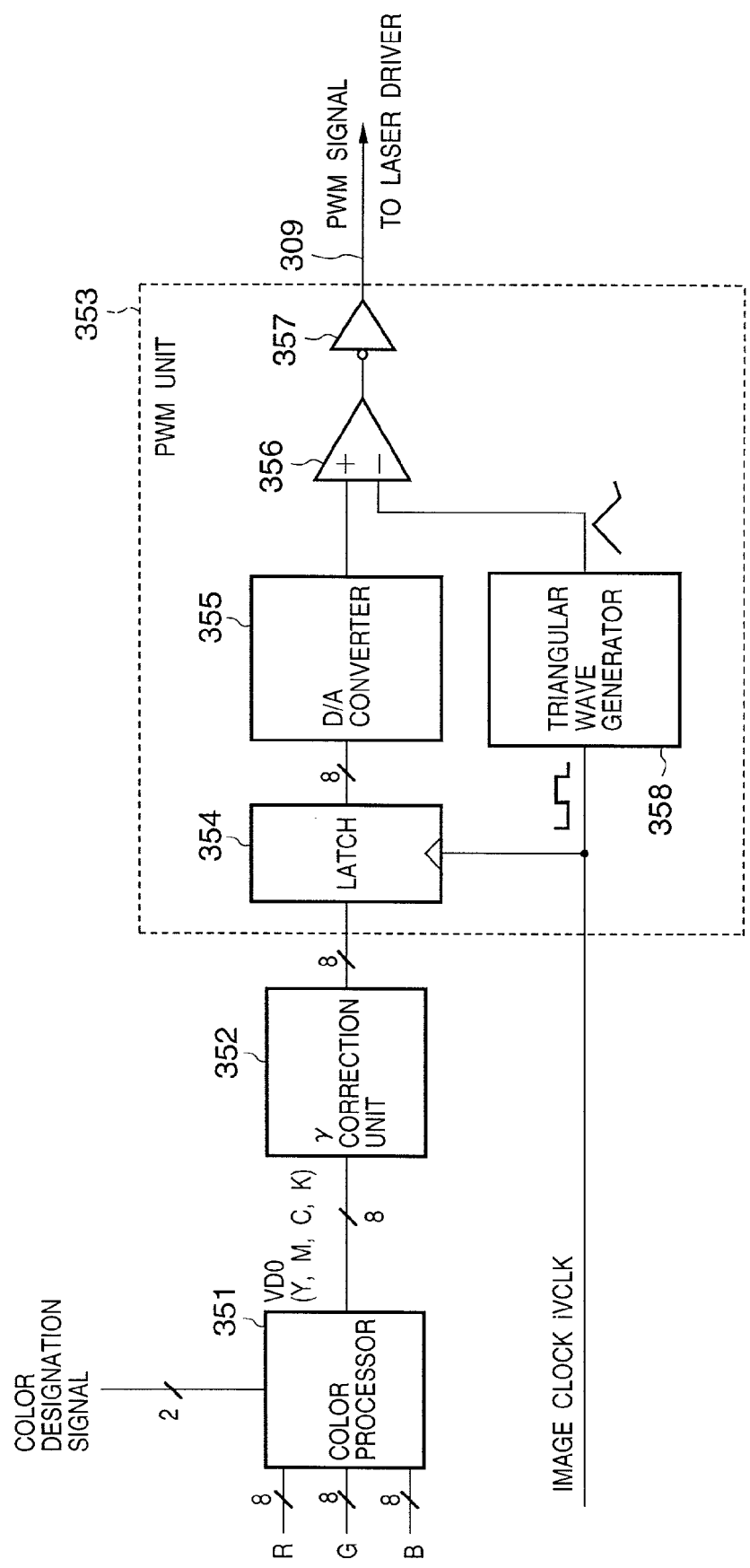
FIG. 22 is a block diagram showing the internal arrangement of an image processor 305.

Analogously, FIG. 17 is an internal block diagram of the tracking pattern generator 410 in a case like this. This circuit obviates the need for a frequency divider for dividing the frequency of a block in synchronism with the BD signal, which is necessary in the above example.

A tracking pattern mixed in this example is in synchronism with the VDO signal 6 as an image signal. So, the printed state is as shown in FIG. 10.

Although a preferred embodiment of the present invention has been described above, the present invention naturally includes arbitrary combinations of some of the abovementioned arrangements.

Also, both the forced ON dot and the forced OFF dot are smaller than one dot in the above embodiment. However, these dots can be larger than one dot, e.g., can be 1⅛ dots or 5/4 dots.

Furthermore, PCLK output from the frequency divider 435 can be entirely different from the image transfer rate. If this is the case, the size and interval of tracking pattern dots are not integral multiples of an image dot. This is established because not absolute dimensions but a printing interval ratio is used to extract codes from the positions of tracking pattern dots. The use of a clock signal of a quartz oscillator by another circuit makes any additional quartz oscillator unnecessary. This can realize an inexpensive arrangement.

In the above embodiment, after the frequency of the output clock from the quartz oscillator 413 is raised by the frequency multiplier 434, the clock is synchronized with the horizontal sync signal to set the phase jitter of a tracking pattern to be several times as small as one dot. However, the phase jitter can also be set to be equal to one dot without using the frequency multiplier 434. Since the frequency multiplier and the like are unnecessary, an inexpensive arrangement can be realized.

Furthermore, although a P-S converter is used to divide one tracking dot into eight portions, PWM (Pulse Width Modulation) is also usable.

In FIG. 6, the counters 426 and 427, the coincidence circuits 428 and 429, the selectors 430 and 431, the P-S circuits 432 and 433, the frequency multiplier 434, the frequency divider 435, the OR gate 415 (not shown), and the AND gate 416 (not shown) can be contained in an ASIC. Additionally, although the OR gate and AND gate are used to mix tracking dots in the VDO signal 6, a selector circuit can also be used.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus for forming an image of multilevel image data, comprising:
    driving means for driving an image forming element for image formation;
    additional data generating means for generating a digital signal string based on predetermined additional data; and
    input means for superposing a digital signal string related to the multilevel image data and the digital signal string based on the additional data and inputting the superposed digital signal string to said driving means, wherein
    said input means executes one of an AND operation and an OR operation of the digital signal string related to the multilevel image data and the digital signal string based on the additional data.

2. The apparatus according to claim 1, wherein said digital signal string related to the multilevel image data and said digital signal string based on predetermined additional data are generated by different clock generation means.

3. The apparatus according to claim 1, wherein the additional data is based on information for specifying said image forming apparatus.

4. The apparatus according to claim 1, further comprising means for generating horizontal scan position information and vertical scan position information in printing scan by said image forming element,
    wherein said additional data generating means generates a digital signal string based on the additional data on the basis of the horizontal scan position information and the vertical scan position information.

5. The apparatus according to claim 1, wherein said additional data generating means comprises means for inputting information of a position on the image to which the additional data is to be added.

6. The apparatus according to claim 1, wherein the multilevel data includes data of at least yellow, cyan, and magenta, and said additional data generating means generates a digital signal string based on the additional data only for a digital signal string of the multilevel image data pertaining to yellow.

7. The apparatus according to claim 1, wherein said image forming element is a light-emitting element.

8. An image forming method of forming an image of multilevel image data by using an image forming element for image formation and driving means for driving said image forming element, comprising the steps of:
    generating a digital signal string based on predetermined additional data; and
    superposing a digital signal string related to the multilevel image data and the digital signal string based on the additional data and inputting the superposed digital signal string to said driving means, wherein
    the digital signal string related to the multilevel image data and the digital signal string based on the additional data one of an AND operation and an OR operation.

9. The method according to claim 8, wherein said digital signal string related to the multilevel image data and said digital signal string based on predetermined additional data are generated by different clock generation means.

10. The method according to claim 8, wherein the additional data is based on information for specifying an apparatus for executing said image forming method.

11. The method according to claim 8, wherein horizontal scan position information and vertical scan position information in printing scan by said image forming element are generated, and a digital signal string based on the additional data is input to an input terminal on the basis of the generated horizontal scan position information and vertical scan position information.

12. The method according to claim 8, wherein information of a position on the image to which the additional data is to be added is generated, and a digital signal string based on the additional data is generated on the basis of the generated position information.

13. The method according to claim 8, wherein the multilevel data includes data of at least yellow, cyan, and magenta, and a digital signal string based on the additional data is generated only for a digital signal string of the multilevel image data pertaining to yellow.

14. The method according to claim 8, wherein said image forming element is a light-emitting element.

15. An image forming apparatus for forming an image of multilevel data, comprising at least two image forming means, each of said image forming means comprising:
    driving means for driving an image forming element for image formation;
    additional data generating means for generating a digital signal string based on predetermined additional data; and
    input means for superposing a digital signal string related to the multilevel image data and the digital signal string based on the additional data and inputting the superposed digital signal string to said driving means, wherein
    said input means executes an exclusive-OR operation of the digital signal string related to the multilevel image data and the digital signal string based on the additional data.

16. The apparatus according to claim 15, wherein said digital signal string related to the multilevel image data and said digital signal string based on predetermined additional data are generated by different clock generation means.

17. The apparatus according to claim 15, wherein the additional data is based on information for specifying said image forming apparatus.

18. The apparatus according to claim 15, further comprising means for generating horizontal scan position information and vertical scan position information in printing scan by said image forming element,
    wherein said additional data generating means generates a digital signal string based on the additional data on the basis of the horizontal scan position information and the vertical scan position information.

19. The apparatus according to claim 15, wherein said additional data generating means comprises means for inputting information of a position on the image to which the additional data is to be added.

20. The apparatus according to claim 15, wherein the multilevel data includes data of at least yellow, cyan, and magenta, and said additional data generating means generates a digital signal string based on the additional data only for a digital signal string of the multilevel image data pertaining to yellow.

21. The apparatus according to claim 15, wherein said image forming element is a light-emitting element.

22. An image forming method of forming an image of multilevel data by using at least two image forming elements for image formation and at least two driving means for driving said image forming elements, comprising the steps of:
    generating a digital signal string based on predetermined additional data for each of said driving means; and
    superposing a digital signal string related to the multilevel image data and the digital signal string based on the additional data and inputting the superposed digital signal string to each of said driving means, wherein
    the digital signal string related to the multilevel image data and the digital signal string based on the additional data are superimposed by executing an exclusive-OR operation.

23. The method according to claim 22, wherein said digital signal string related to the multilevel image data and said digital signal string based on predetermined additional data are generated by different clock generation means.

24. The method according to claim 22, wherein the additional data is based on information for specifying an apparatus for executing said image forming method.

25. The method according to claim 22, wherein horizontal scan position information and vertical scan position information in printing scan by said image forming element are generated and, on the basis of the generated horizontal scan position information and vertical scan position information, a digital signal string based on the additional data is input to said input terminal.

26. The method according to claim 22, wherein information of a position on the image to which the additional data is to be added is generated and, on the basis of the generated position information, a digital signal string based on the additional data is generated.

27. The method according to claim 22, wherein the multilevel data includes data of at least yellow, cyan, and magenta, and a digital signal string based on the additional data is generated only for a digital signal string of the multilevel image data pertaining to yellow.

28. The method according to claim 22, wherein said image forming element is a light-emitting element.

* * * * *

UNITED STATES PATENT AND TRADEMARK OFFICE
CERTIFICATE OF CORRECTION

PATENT NO.        : 6,967,727 B1
APPLICATION NO.   : 09/675141
DATED             : November 22, 2005
INVENTOR(S)       : Takashi Kawana It is certified that error appears in the above-identified patent and that said Letters Patent is hereby corrected as shown below:

COLUMN 8
Line 25, "PSYN" should read --PSYNC--.

Signed and Sealed this

Fifth Day of December, 2006

JON W. DUDAS
*Director of the United States Patent and Trademark Office*